(12) United States Patent
Kato

(10) Patent No.: US 12,511,005 B2
(45) Date of Patent: Dec. 30, 2025

(54) POSITION DETECTION DEVICE

(71) Applicant: Wacom Co., Ltd., Saitama (JP)

(72) Inventor: So Kato, Saitama (JP)

(73) Assignee: Wacom Co., Ltd., Saitama (JP)

( * ) Notice: Subject to any disclaimer, the term of this patent is extended or adjusted under 35 U.S.C. 154(b) by 112 days.

(21) Appl. No.: 18/506,732

(22) Filed: Nov. 10, 2023

(65) Prior Publication Data

US 2024/0086022 A1    Mar. 14, 2024

Related U.S. Application Data

(63) Continuation of application No. PCT/JP2022/019642, filed on May 9, 2022.

(30) Foreign Application Priority Data

Jun. 8, 2021 (JP) ................. 2021-095521

(51) Int. Cl.
*G06F 3/046* (2006.01)
*G06F 3/041* (2006.01)
*G06F 3/044* (2006.01)

(52) U.S. Cl.
CPC .......... *G06F 3/046* (2013.01); *G06F 3/04166* (2019.05); *G06F 3/0445* (2019.05); *G06F 3/0446* (2019.05)

(58) Field of Classification Search
CPC ...... G06F 3/046; G06F 3/0446; G06F 3/0445; G06F 3/04166; G06F 3/041; G06F 2203/04106
See application file for complete search history.

(56) References Cited

U.S. PATENT DOCUMENTS 11,727,380 B1 *   8/2023  Fernandez ............. G06Q 20/32
                                                       705/17
2011/0006759 A1*  1/2011  Fukushima ............ G06F 3/046
                                                   324/207.15
(Continued)

FOREIGN PATENT DOCUMENTS

CN      206133516 U     4/2017
JP      2011022661 A    2/2011
(Continued)

OTHER PUBLICATIONS

English Translation of International Search Report dated Jul. 19, 2022, for the corresponding International Patent Application No. PCT/JP2022/019642, 3 pages.

(Continued)

*Primary Examiner* — Doon Y Chow
(74) *Attorney, Agent, or Firm* — Seed Intellectual Property Law Group LLP

(57) ABSTRACT

Provided is a position detection device including a sensor in which a plurality of first electrodes arranged in a first direction and a plurality of second electrodes arranged in a second direction intersecting the first direction are stacked, a position detection circuitry that, in operation, detects an indicated position on the sensor based on output signals from the first electrodes and the second electrodes of the sensor, and a protective member that is formed in a bag shape and houses at least the sensor inserted from an opening, the protective member having a surface serving as an operation surface.

13 Claims, 12 Drawing Sheets

(56) References Cited

U.S. PATENT DOCUMENTS

| | | | | |
|---|---|---|---|---|
| 2012/0138490 | A1* | 6/2012 | Hollander | A45C 11/00 |
| | | | | 206/320 |
| 2014/0166658 | A1* | 6/2014 | Hamra | A45F 5/00 |
| | | | | 220/500 |
| 2014/0340326 | A1* | 11/2014 | Kameyama | G06F 3/03545 |
| | | | | 345/173 |
| 2016/0026273 | A1 | 1/2016 | Inaba et al. | |
| 2020/0409420 | A1 | 12/2020 | Nakamura et al. | |
| 2021/0106125 | A1* | 4/2021 | Thomas | A45F 3/04 |

FOREIGN PATENT DOCUMENTS

| | | | |
|---|---|---|---|
| JP | 3187455 U | | 11/2013 |
| JP | 2013235533 A | | 11/2013 |
| JP | 2016024754 A | | 2/2016 |
| JP | 3211444 U | | 7/2017 |
| JP | 3211944 U | * | 8/2017 |
| JP | 3224999 U | | 2/2020 |
| JP | 2021009363 A | | 1/2021 |
| JP | 2021012425 A | | 2/2021 |
| TW | M472047 U | * | 2/2014 |

OTHER PUBLICATIONS

Moooii, "[Review] 'GAOMON Pen Tablet S56K' pen tablet with pressure sensitivity that can be purchased for less than 4,000 yen," 2023, 29 pages.

* cited by examiner

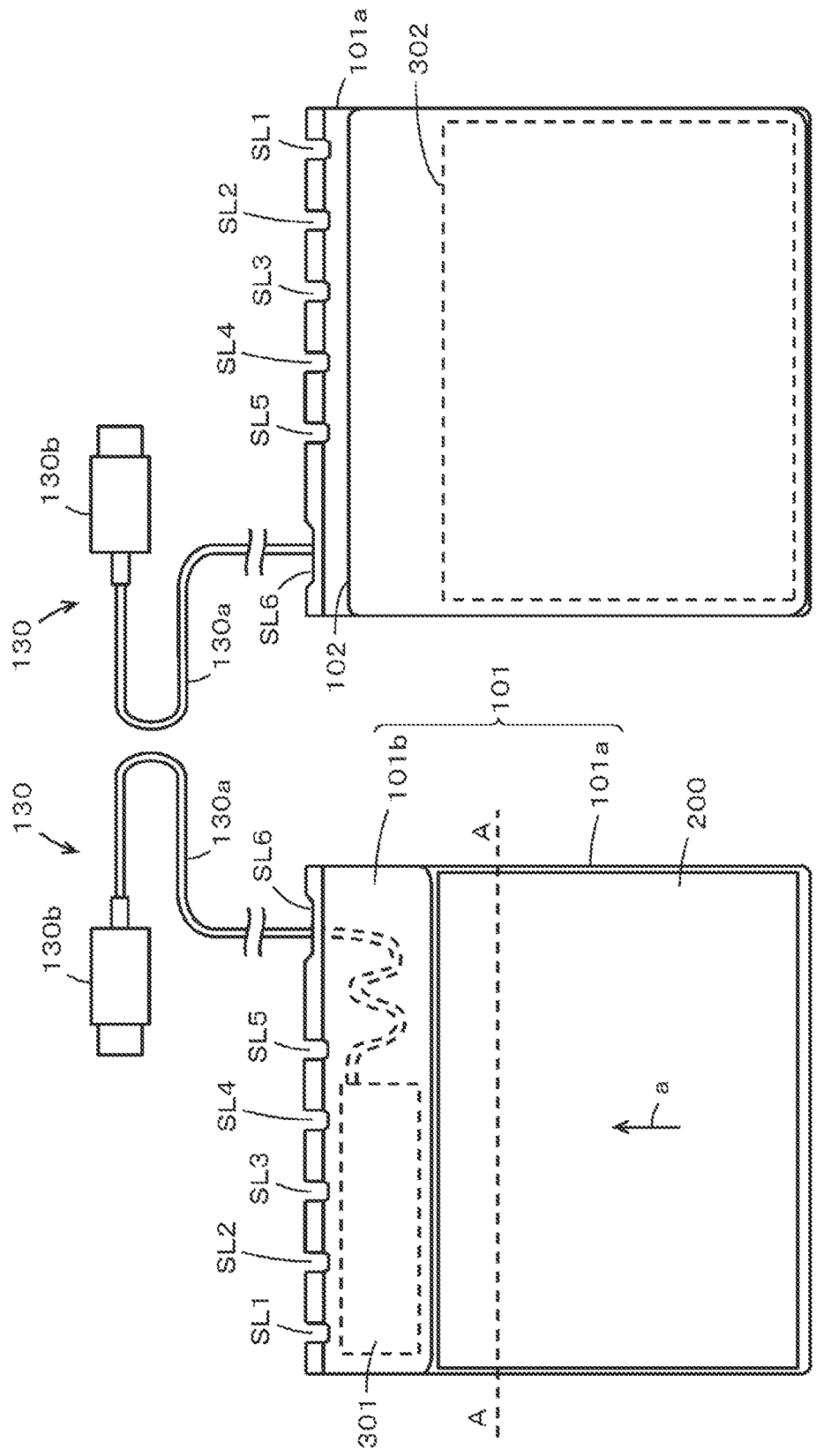

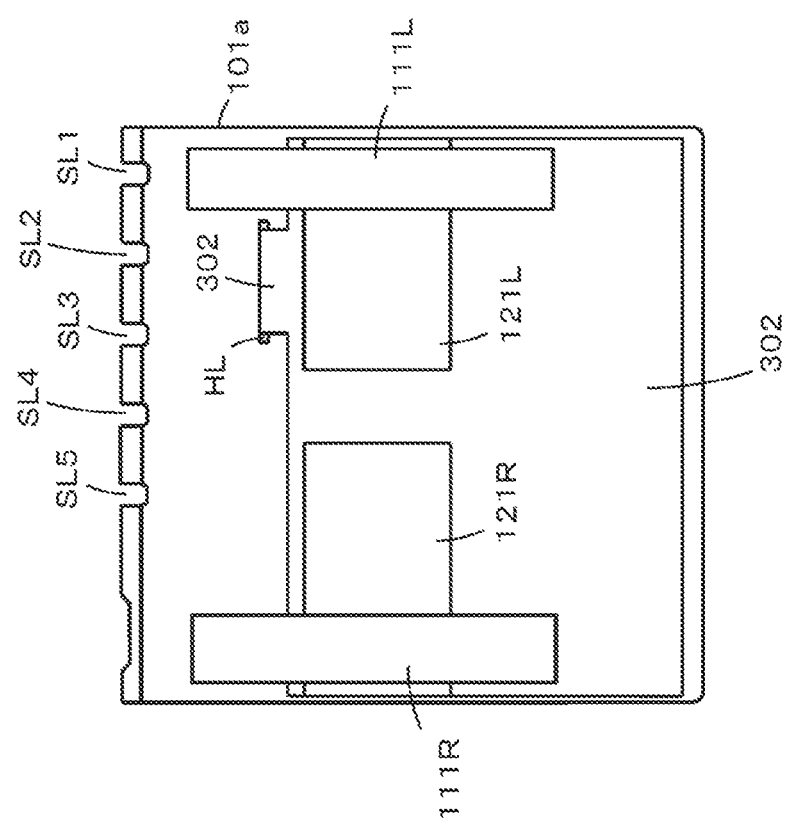
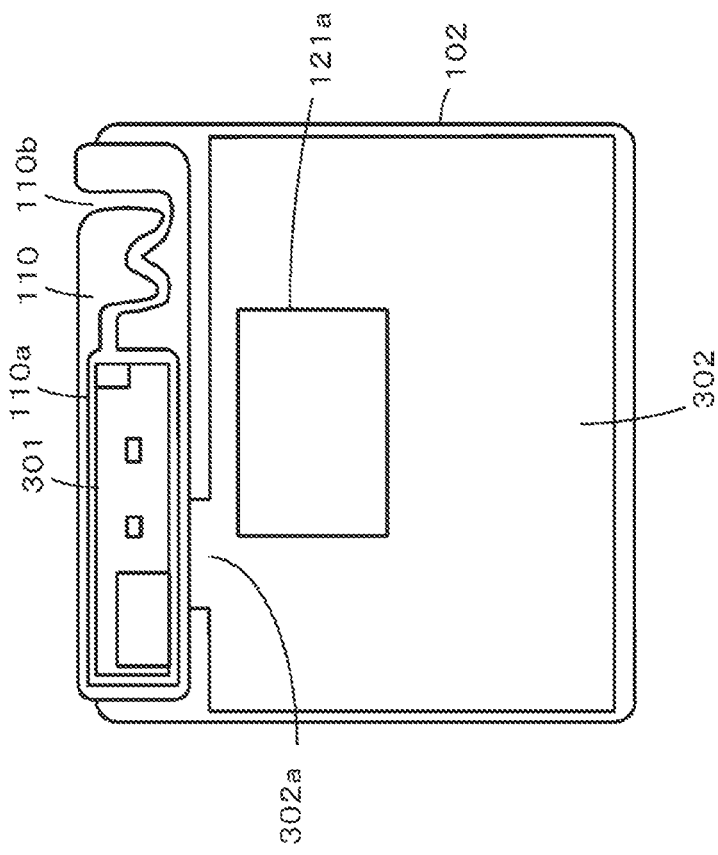
FIG.16A
FIG.16B

POSITION DETECTION DEVICE

BACKGROUND

Technical Field

The present disclosure relates to a position detection device called, for example, a pen tablet used as an input device for an electronic device such as a personal computer.

Description of the Related Art

What are generally called position detection devices called "pen tablets" are widely used. The position detection devices called "pen tablets" enable a drawing input in response to users performing pointing operations with pen-shaped operators called "electronic pens." Pen tablets have become essential items when, for example, animation and design are created. In the field of electronic devices, tablets are computers or computer peripheral devices that are formed in a plate shape. There are two types of pen tablets: one is called a liquid crystal tablet and the other is called a rectangular and thin plate-shaped tablet (hereinafter referred to as a "plate tablet"). A liquid crystal tablet is an input/output device such as a personal computer that includes a liquid crystal display and a position detection sensor and is capable of performing a drawing input and a drawing display. A plate tablet is an input device such as a personal computer that includes a position detection sensor but not a display device and is capable of performing a drawing input.

As illustrated in FIG. 1 of Japanese Utility Model Registration No. 3224999, a liquid crystal tablet is configured such that a motherboard (4), a position detection sensor (3), and a liquid crystal display (2) are housed in a housing (1B) from a bottom layer side and enclosed by a front panel (1A). The housing (1B) is formed of, for example, a hard resin, and the front panel (1A) is formed using, for example, tempered glass. A plate tablet is also configured similarly to the liquid crystal tablet except that the plate tablet does not include the liquid crystal display (2). Therefore, the motherboard (4), the position detection sensor (3), and the liquid crystal display (2), which need to be protected from an external force, are protected by the housing (1B) and the front panel (1A), so that a sturdy liquid crystal tablet or plate tablet is configured.

Liquid crystal tablets and plate tablets, which house position detection sensors and so forth in their housings, are sturdy as described above but have a considerable thickness, making them inconvenient to carry around. Therefore, in general, liquid crystal tablets and plate tablets are fixedly installed on desks when used. In recent years, plate-shaped personal computers called tablet personal computers (PCs) have become widely used. Tablet PCs include thin displays such as liquid crystal displays and position detection sensors and enable a drawing input and the like with electronic pens. Tablet PCs are, for example, in B5 or A4 size, which is the industrial standard for paper, and have a comparatively thin configuration with a thickness of approximately 10 mm, making them convenient to carry around. Therefore, tablet PCs are widely used also on the go.

However, tablet PCs are comparatively expensive since they include liquid crystal displays. Moreover, if users have already owned laptop computers, smartphones, or the like, not everyone is able to own tablet PCs with ease, since these devices have the same functions as the tablet PCs. Therefore, there is a need for an easy-to-carry and simply configured plate tablet (position detection device) that realizes a relatively large operation input region by connecting the plate tablet to a laptop computer or a smartphone and enables a drawing input with an electronic pen. Such a portable plate tablet is an important learning tool particularly for students because it allows them to directly create handwritten notes in electronic form.

BRIEF SUMMARY

In view of the foregoing, it is desirable to realize a position detection device that is simply configured and extremely thin and thus easy to carry around.

There is provided a position detection device including a sensor in which a plurality of first electrodes arranged in a first direction and a plurality of second electrodes arranged in a second direction intersecting the first direction, are stacked a position detection circuitry that, in operation, detects an indicated position on the sensor based on output signals from the first electrodes and the second electrodes of the sensor, and a protective member that is formed in a bag shape and houses at least the sensor inserted from an opening, the bag-shaped protective member having a first surface serving as an operation surface.

According to this position detection device, the sheet-shaped sensor is housed in the protective member, and the first surface of the protective member serves as the operation surface. The first electrodes and the second electrodes of the sensor are connected to the position detection circuitry to enable the detection of the position indicated by an electronic pen on a position detection sensor. Since the position detection device can be configured by housing the sensor in the protective member in this way, the position detection device has a simple configuration and is extremely thin.

BRIEF DESCRIPTION OF THE SEVERAL VIEWS OF THE DRAWINGS

FIGS. 13A and 13B are views of the appearance of a position detection device according to a second embodiment of the present disclosure;

FIGS. 16A and 16B are views for describing the internal structure of the position detection device according to the second embodiment.

DETAILED DESCRIPTION

Figure 1:
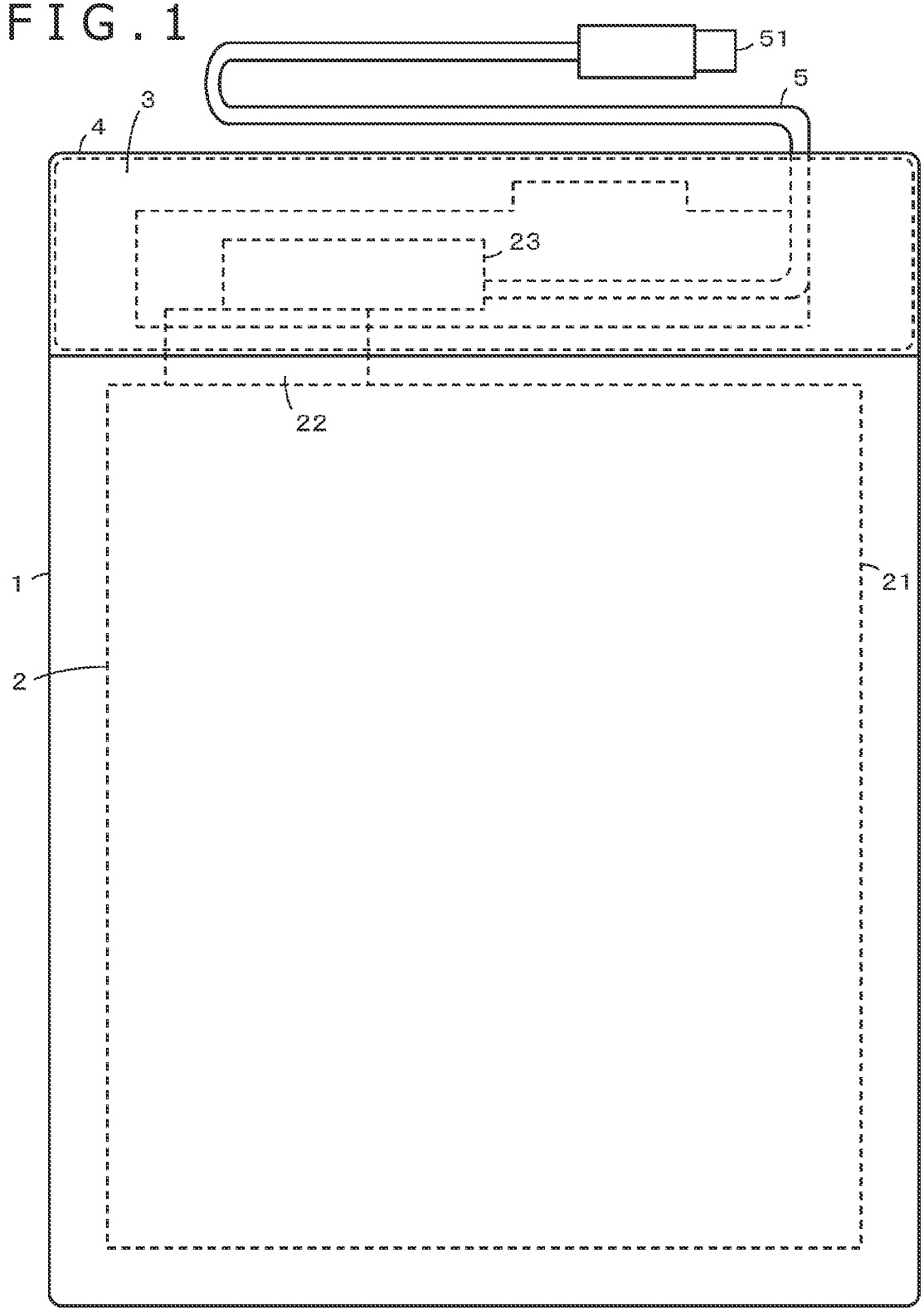
FIG. 1 is a view for describing an example of a configuration of a position detection device according to a first embodiment of the present disclosure.

A position detection device according to one or more embodiments of the present disclosure is described below with reference to the drawings. The position detection device described below functions as what is generally called a "plate tablet" that is connected to and used with, for example, a laptop computer or a high-function mobile phone called a smartphone. The position detection device according to one or more embodiments of the present disclosure is extremely thin and has a simple configuration, making it convenient to carry around and easy to use even when away from home. Needless to say, the position detection device can also be used at home by connecting it to a desktop personal computer.

There are a position detection device of an electromagnetic induction system and a position detection device of a capacitive system. In the electromagnetic induction system, the position detection device includes a sensor in which loop coils are arranged in each of an X-axis direction and a Y-axis direction. The position detection device alternates between a transmission period and a reception period. In the transmission period, power is sequentially supplied to the loop coils of the sensor to generate a magnetic field. In the reception period, the supply of the power stops, and a magnetic field is received from the outside of the position detection device. A corresponding electronic pen includes a resonance circuit including a coil and a capacitor. A current flows through the coil in response to the magnetic field from the sensor generates a signal. The electronic pen then transmits a signal including writing pressure information to the position detection device. The position detection device receives this signal during the reception period and detects the position indicated by the electronic pen and the writing pressure of the electronic pen.

In the capacitive system, the position detection device includes a sensor in which line electrodes (linear conductors) are arranged in each of an X-axis direction and a Y-axis direction. The sensor detects the indicated position according to a change in capacitance (electric charge) generated in the line electrodes when a finger or a capacitive pen (electronic pen) is brought close to the sensor. The capacitive pen may be a rod-shaped capacitive pen simply having conductivity or may be a capacitive pen (active capacitive pen) that is driven by a battery and transmits a signal. In the case of an active capacitive coupling system using the active capacitive pen, the capacitive pen transmits a signal from an oscillation circuit mounted in the capacitive pen together with writing pressure information, and the position detection device receives the signal including the writing pressure information, thereby detecting the indicated position and the writing pressure.

The position detection device according to one or more embodiments of the present disclosure may be configured as a position detection device of an electromagnetic induction (electro magnetic resonance (EMR)) system or as a position detection device of an active capacitive (AES) system. The following description first assumes a case where the present disclosure is applied to a position detection device of the electromagnetic induction system as an example.

Overall Configuration of Position Detection Device (Plate Tablet) According to First Embodiment FIG. 1 is a view for describing an example of a configuration of a position detection device (plate tablet) according to a first embodiment. In FIG. 1, portions illustrated in solid lines are portions that can be directly seen, and portions illustrated in dotted lines are portions that cannot be directly seen because they are housed inside. As illustrated in FIG. 1, the position detection device according to the first embodiment includes five members: a bag-shaped protective member 1, a position detection sensor member 2, a spacer member 3, a board cover member 4, and a USB cable 5.

As illustrated in FIG. 1, the position detection device according to the first embodiment is configured such that the position detection sensor member 2 is housed inside the bag-shaped protective member 1, which is formed into a bag shape with the perimeters of two sheets joined together and having an opening, as described in detail later. As indicated by the dotted line in FIG. 1, the position detection sensor member 2 is a portion formed by connecting a sheet-shaped sensor 21 and a position detection circuitry 23 via a connection portion 22.

The spacer member 3 is a member having an opening inside thereof and having a thickness, as described later. The spacer member 3 is provided on the upper side of the bag-shaped protective member 1 as indicated by a rectangular dotted line on the upper end side of FIG. 1 and forms a space in which the position detection circuitry 23 of the position detection sensor member 2 is provided. The board cover member 4 is a plate-shaped member of a shape and a size similar to those of the spacer member 3 and is provided in such a manner as to cover a top surface (front surface) of the spacer member 3.

The spacer member 3 and the board cover member 4 secure the space in which the position detection circuitry 23 is provided, protect the position detection circuitry 23, and also function as closing members to close the opening of the bag-shaped protective member 1. The USB cable 5 has one end connected to the position detection circuitry 23 and the other end including a USB connector 51 to enable the connection to an electronic device such as a laptop computer or a smartphone.

As described above, the position detection device according to the first embodiment includes the five members and has an extremely simple configuration, so that the position detection device can easily be produced. In addition, since the position detection device according to the first embodiment is configured such that the position detection sensor member 2, which includes the sheet-shaped sensor 21, is housed in the bag-shaped protective member 1, the position detection device is extremely thin and easy to carry around. The following specifically describes each of the constituent members of the position detection device according to the first embodiment to further clarify the overall configuration of the position detection device.

Example of Configuration of Bag-Shaped Protective Member 1

Figure 2:
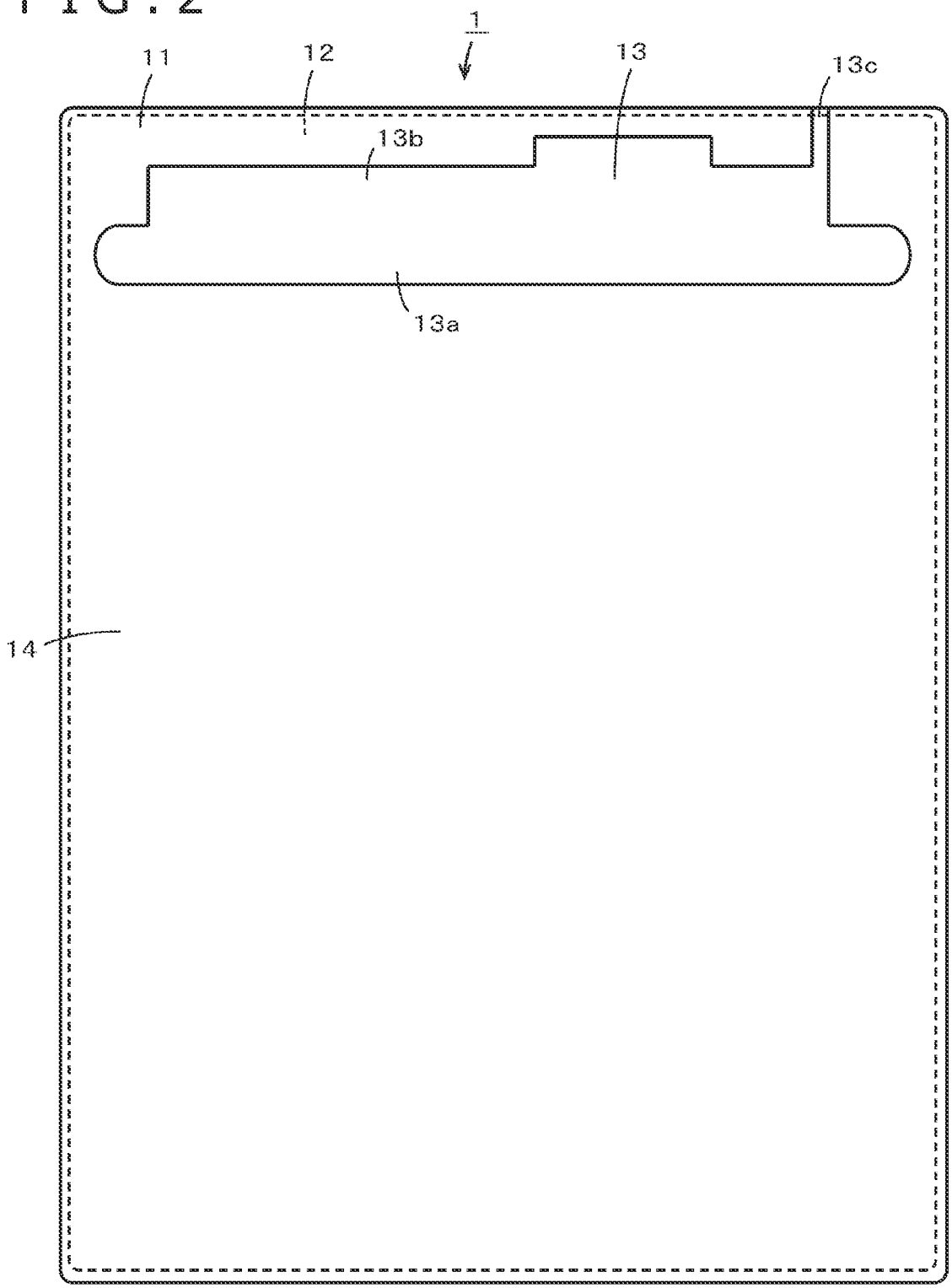
FIG. 2 is a view for describing a bag-shaped protective member.

FIG. 2 is a view for describing the bag-shaped protective member 1. The bag-shaped protective member 1 is configured by superimposing a front surface sheet 11 and a back surface sheet 12 on each other, which are formed of a resin material, welding their perimeters (indicated by the dotted line) by ultrasonic heat welding, and providing a horizontally-long opening 13 on the upper end side of the front surface sheet 11. In other words, the front surface sheet 11 and the back surface sheet 12 are superimposed on each other and the four sides (top, bottom, left, and right sides) are welded and closed to configure the bag-shaped protective member 1 with the opening 13 provided. This constitutes the bag-shaped protective member (protective member formed in a bag shape) 1 as a "container" in which objects can be put in and out from the opening 13. The appearance of the bag-shaped protective member 1 resembles that of a clear file of stationery, except for the opening 13. An inner surface of the back surface sheet 12 is exposed through the opening 13.

A wide opening portion 13a with left and right ends each protruding in a semicircular shape is formed on the lower side of the opening 13 provided on the front surface sheet 11 of the bag-shaped protective member 1. Through this wide opening portion 13a, the sheet-shaped sensor 21 of the position detection sensor member 2 described later can easily be inserted into the bag-shaped protective member 1. A rectangular opening portion 13b is located on the upper side of the wide opening portion 13a. A combined region of the wide opening portion 13a excluding the semicircular-shaped protruding portions at the left and right ends of the wide opening portion 13a and the rectangular opening portion 13b is a region in which the position detection circuitry 23 of the position detection sensor member 2 and part of the USB cable 5 are provided, as described in detail later. A slit (gap) 13c, which is connected to the outside of the position detection device, is provided at the upper right end of the opening 13. Through this slit 13c, the USB cable 5 is led out to the outside of the position detection device.

In this way, the bag-shaped protective member 1 mainly houses the sensor 21 of the position detection sensor member 2 described later, and a region under the opening 13 is an operation input region (operation surface) 14, which accepts an input of the position indicated by an electronic pen. In the first embodiment, the front surface sheet 11 and the back surface sheet 12 are formed using, for example, polypropylene. Needless to say, this is just one example. The front surface sheet 11 and the back surface sheet 12 can be formed using any of various resin materials such as polyethylene terephthalate, polyamide, polyacetal, polyvinyl chloride, an acrylonitrile butadiene styrene (ABS) resin, and polycarbonate, for example.

Example of Configuration of Position Detection Sensor Member 2

Figure 3:
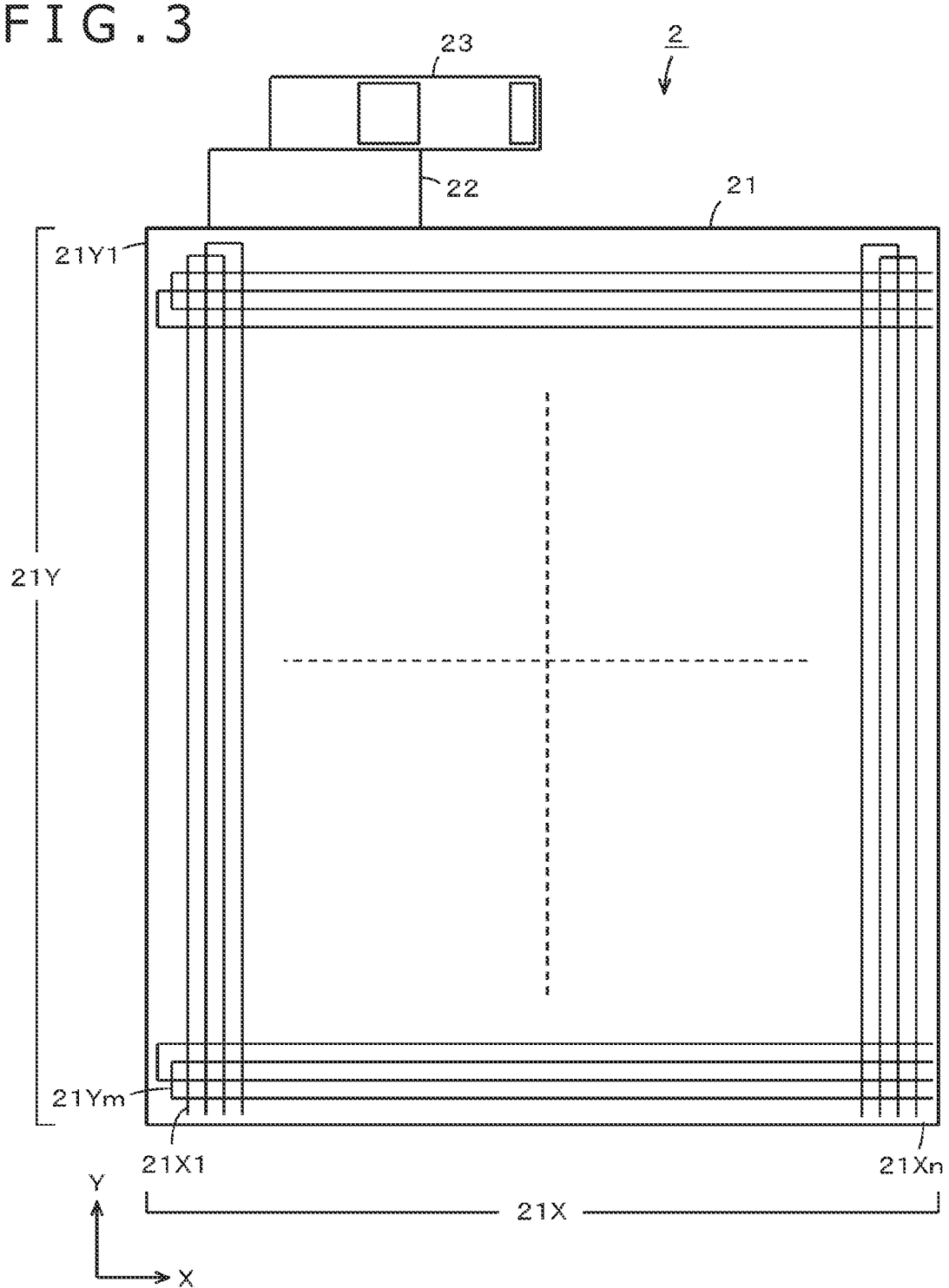
FIG. 3 is a view for describing a position detection sensor member.
Figure 4:
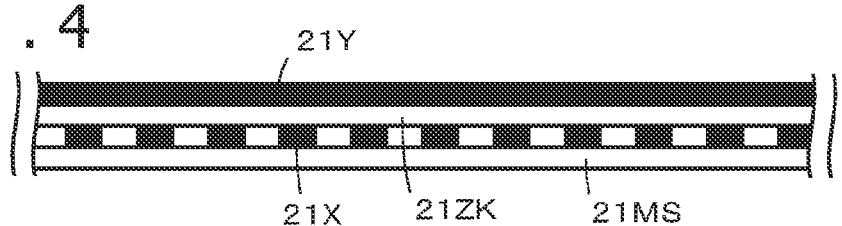
FIG. 4 is a cross-sectional view of a sensor of the position detection sensor member.

FIG. 3 is a view for describing the position detection sensor member 2. FIG. 4 is a cross-sectional view of the sensor 21 of the position detection sensor member 2. As described above, the position detection sensor member 2 according to the first embodiment is of the electromagnetic induction system (EMR system) and includes the sensor 21, the connection portion 22, and the position detection circuitry 23. The sensor 21 includes a Y-axis direction loop coil group 21Y including m Y-axis direction loop coils 21Y1 to 21Ym, which extend in the X-axis direction (horizontal direction) and are arranged in the Y-axis direction (vertical direction). The sensor 21 also includes an X-axis direction loop coil group 21X including n X-axis direction loop coils 21X1 to 21Xn, which extend in the Y-axis direction (vertical direction) and are arranged in the X-axis direction (horizontal direction). In FIG. 3, the Y-axis direction loop coils located at the top and bottom ends of the sensor 21 and the X-axis direction loop coils located at the left and right ends of the sensor 21 are illustrated, and the illustration of the other loop coils is omitted. In actual implementation, the plurality of Y-axis direction loop coils and the plurality of X-axis direction loop coils are arranged at predetermined intervals over the entire surface of the sensor 21.

More specifically describing the structure of the sensor 21, as illustrated in FIG. 4, the Y-axis direction loop coil group 21Y is formed on the upper side of an insulating layer 21ZK, which is made of an insulator base film, and the X-axis direction loop coil group 21X is formed on the lower side of the insulating layer 21ZK. On the lower side of the X-axis direction loop coil group 21X, a metal sheet member 21MS is provided. In this way, the sensor 21 having the four-layer structure is configured as a whole as what is generally called a flexible printed circuit. The metal sheet member 21MS constitutes what is generally called a magnetic path board such that the Y-axis direction loop coils 21Y1 to 21Ym and the X-axis direction loop coils 21X1 to 21Xn can efficiently receive signals from the electronic pen.

The connection portion 22 is a portion from which the m Y-axis direction loop coils 21Y1 to 21Ym and the n X-axis direction loop coils 21X1 to 21Xn, which constitute the sensor 21, are led out and which connects them to the position detection circuitry 23. The connection portion 22 puts together the m Y-axis direction loop coils 21Y1 to 21Ym and the n X-axis direction loop coils 21X1 to 21Xn to firmly connect the sensor 21 to the position detection circuitry 23. In this case, one end of each of the Y-axis direction loop coils 21Y1 to 21Ym and the X-axis direction loop coils 21X1 to 21Xn is connected to the position detection circuitry 23 while the other end thereof is grounded. The connection portion 22 also has a stacked structure similar to that of the sensor 21 and is configured as a flexible printed circuit.

In the transmission period, the position detection circuitry 23 sequentially switches the m Y-axis direction loop coils 21Y1 to 21Ym and the n X-axis direction loop coils 21X1 to 21Xn to transmits a signal. In the reception period, the position detection circuitry 23 sequentially switches the m Y-axis direction loop coils 21Y1 to 21Ym and the n X-axis direction loop coils 21X1 to 21Xn to receives a signal from the electronic pen. The position detection circuitry 23 receives the signal from the electronic pen, thereby detecting the indicated position on the sensor 21 according to a change in the signal (current) generated in each loop coil. In short, the point of intersection between the Y-axis direction loop coil and the X-axis direction loop coil where the signal (current) changes significantly can be detected as the indicated position.

In this way, the position detection sensor member 2 includes the sensor 21, the connection portion 22, and the position detection circuitry 23, with the sensor 21 accounting for the majority of the area of the position detection sensor member 2. Although the sensor 21 has a four-layer structure as described above, the thickness of the sensor 21 is as thin as 1 mm or less. Since the sensor 21 is configured as the flexible printed circuit, the sensor 21 is flexible and can repeatedly be deformed with a weak force. Further, the sensor 21 is capable of maintaining its electrical characteristics even when it is deformed. Therefore, the sensor 21 is sturdy and is not damaged even if it is slightly bent. Thus, the position detection sensor member 2 is an important constituent element of the position detection device that is also suitable for carrying around.

Example of Configuration of Spacer Member 3

Figure 5A:
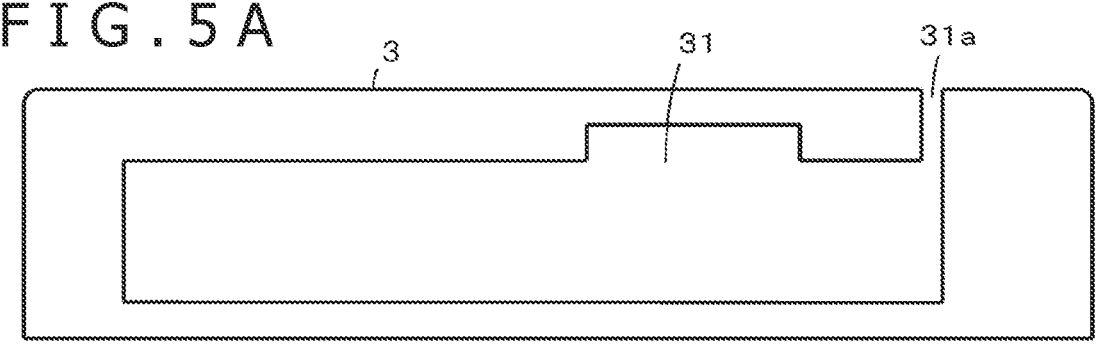
FIGS. 5A and 5B are views for describing a spacer member.
Figure 5B:
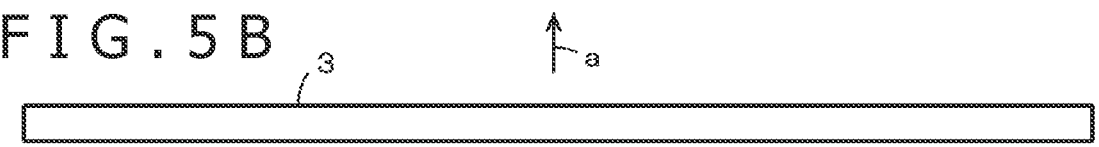

FIGS. 5A and 5B are views for describing the spacer member 3. Specifically, FIG. 5A is a top view of the spacer member 3. FIG. 5B is a side view when seen from an arrow a. As illustrated in FIG. 5A, the spacer member 3 has a substantially rectangular shape and includes an opening 31 inside thereof. The opening 31 matches most of the opening 13 of the bag-shaped protective member 1. A slit (gap) 31a, which leads to the outside of the position detection device, is provided on the right end side of the opening 31. In other words, although the opening 13 of the bag-shaped protective member 1 has the wide opening portion 13a as illustrated in FIG. 2, the spacer member 3 has no portions protruding in a semicircular shape toward the left and right ends in the lower portion. In this way, the opening 13 of the bag-shaped protective member 1 and the opening 31 of the spacer member 3 are different from each other in the presence or absence of the portions protruding in a semicircular shape toward the left and right ends in the lower portion.

The spacer member 3 has a predetermined thickness, as illustrated in the side view of FIG. 5B. This thickness is slightly larger than the thickness of the position detection circuitry 23 of the position detection sensor member 2. This structure protects the position detection circuitry 23 of the position detection sensor member 2, which is positioned inside the opening 31, such that an external force (force applied from the outside) is not directly applied to the position detection circuitry 23, as described in detail later.

It is preferable that the spacer member 3 be formed of a material such as a resin material such as urethane, synthetic rubber, natural rubber, or felt that has a certain degree of elasticity and absorbs an external force to prevent the external force from affecting the position detection circuitry 23. Needless to say, the spacer member 3 may be formed of such a material as a hard resin, metal, or wood. In the first embodiment, the spacer member 3 is prepared as what is generally called a double-sided tape spacer member by applying an adhesive to the entire front surface and back surface thereof and attaching release paper thereto. This allows the spacer member 3 to be handled like what is generally called a double-sided tape such that the spacer member 3 can be attached to the bag-shaped protective member 1 and the board cover member 4 described later can be attached to the spacer member 3. In other words, the members can easily be attached to each other.

Example of Configuration of Board Cover Member 4

Figure 6:
FIG. 6 is a view for describing a board cover member.

FIG. 6 is a view for describing the board cover member 4. The board cover member 4 is a rectangular plate-shaped member. The outer edge shape of the board cover member 4 is the same as that of the spacer member 3 illustrated in FIG. 5A, and the size of the board cover member 4 is approximately the same as that of the spacer member 3 illustrated in FIG. 5A. The board cover member 4 has no opening and is attached to the spacer member 3 in such a manner as to cover the entire top surface of the spacer member 3. This allows the opening 31 of the spacer member 3 and the opening 13 of the bag-shaped protective member 1 to be closed and prevents the position detection circuitry 23 of the position detection sensor member 2 provided in the opening 31 of the spacer member 3 from being exposed, thereby protecting the position detection circuitry 23.

The board cover member 4 can be formed of any of various materials that do not easily deform and meet predetermined strength requirements. Examples of such materials include a hard resin such as an ABS resin, metal such as aluminum, and a leather material. The board cover member 4 according to the first embodiment is formed of an ABS resin, for example.

Example of Configuration of USB Cable 5

Figure 7:
FIG. 7 is a view for describing a universal serial bus (USB) cable.

FIG. 7 is a view for describing the USB cable 5. The USB cable 5 conforms to the USB standard which is one of the serial bus standards for connecting peripheral devices to electronic devices such as computers (information processing devices). In addition to transmitting and receiving information, the USB cable 5 is capable of receiving a power supply. The USB cable 5 includes a circuit-side connector 52 at one end. The circuit-side connector 52 of the USB cable 5 is connected and fixed to the position detection circuitry 23 of the position detection sensor member 2. In the first embodiment, the USB cable 5 is provided in the state in which it is connected to the position detection circuitry 23 of the position detection sensor member 2.

The USB cable 5 includes the USB connector (male (pin insert) side) 51 at the other end thereof. Through the USB connector 51, the USB cable 5 can be connected to an electronic device such as a personal computer or a smartphone, for example. Accordingly, information indicating the position indicated by the electronic pen and detected through the position detection sensor member 2 is supplied through the USB cable 5 to an electronic device such as a personal computer connected to the USB cable 5. The electronic device such as the personal computer can perform drawing processing and the like according to the indicated position provided through the USB cable 5.

Procedure for Assembling Position Detection Device (Plate Tablet)

By preparing the bag-shaped protective member 1, the position detection sensor member 2, the spacer member 3, the board cover member 4, and the USB cable 5 configured as described above, the position detection device (plate tablet) according to the first embodiment can easily be assembled as described below. In this case, no tools are required. In the first embodiment, as described above, the USB cable 5 is assumed to be provided with the circuit-side connector 52 provided at one end of the USB cable 5 and connected to the position detection circuitry 23 of the position detection sensor member 2. Therefore, the work process of connecting the USB cable 5 to the position detection circuitry 23 is not necessary. The assembly procedure is described below.

As a first step, with the bag-shaped protective member 1 (FIG. 2) placed on a workbench, the entire sensor 21 of the position detection sensor member 2 (FIG. 3) is inserted into the bag-shaped protective member 1 from the wide opening portion 13a of the opening 13 of the bag-shaped protective member 1. As indicated by the dotted line in FIG. 1, the sensor 21 is positioned between the front surface sheet 11 and the back surface sheet 12 of the bag-shaped protective member 1, and the position detection circuitry 23 is positioned within the opening 13 of the bag-shaped protective member 1. The connection portion 22 of the position detection sensor member 2 is positioned between the front surface sheet 11 and the back surface sheet 12 of the bag-shaped protective member 1, with part of the connection portion 22 located in the lower portion of the opening 13 of the bag-shaped protective member 1, as illustrated in FIG. 1.

In this case, as a second step, a back surface of the connection portion 22 of the position detection sensor member 2 and a back surface of the position detection circuitry 23 are attached to the inner surface of the back surface sheet 12 of the bag-shaped protective member 1 by applying double-sided tapes thereto and peeling off release paper. Accordingly, the position detection sensor member 2 housed in the bag-shaped protective member 1 can be fixed to the bag-shaped protective member 1. Next, as a third step, the spacer member 3 (FIGS. 5A and 5B) is attached to the upper portion of an outer surface of the front surface sheet 11 of the bag-shaped protective member 1 such that the opening 31 of the spacer member 3 matches the opening 13 of the bag-shaped protective member 1. As described above, the spacer member 3 has both surfaces to which an adhesive is applied, like a double-sided tape.

Next, as a fourth step, the USB cable 5 (FIG. 7) connected to the position detection circuitry 23 of the position detection sensor member 2 is wired in such a manner as to be led out to the outside of the position detection device through the slit 31a of the opening 31 of the spacer member 3. The slit 13c of the bag-shaped protective member 1 is provided under the slit 31a of the opening 31 of the spacer member 3. Finally, as a fifth step, the board cover member 4 (FIG. 6) is attached to the top surface of the spacer member 3, which is attached to the bag-shaped protective member 1. Accordingly, the opening 13 of the bag-shaped protective member 1 and the opening 31 of the spacer member 3 are closed by the board cover member 4. Accordingly, the connection portion 22 and the position detection circuitry 23 of the position detection sensor member 2 are covered by the board cover member 4, and the position detection device according to the first embodiment is completed.

In this way, the position detection device is assembled in the following steps of inserting the position detection sensor member 2 into the bag-shaped protective member 1, fixing the position detection sensor member 2 to the bag-shaped protective member 1, fixing the spacer member 3 to the bag-shaped protective member 1, leading out the USB cable 5, and fixing the board cover member 4. No tools are required for any of these steps (processes), and it is extremely easy to assemble the position detection device that functions as a plate tablet. Note that the slit 13c can be omitted. Waterproofing can be provided by passing the USB cable 5 through the slit 31a and closing the slit 31a with a rubber seal or the like.

Use of Feel-of-Writing Sheet and Non-Slip Sheet

Figure 8B:
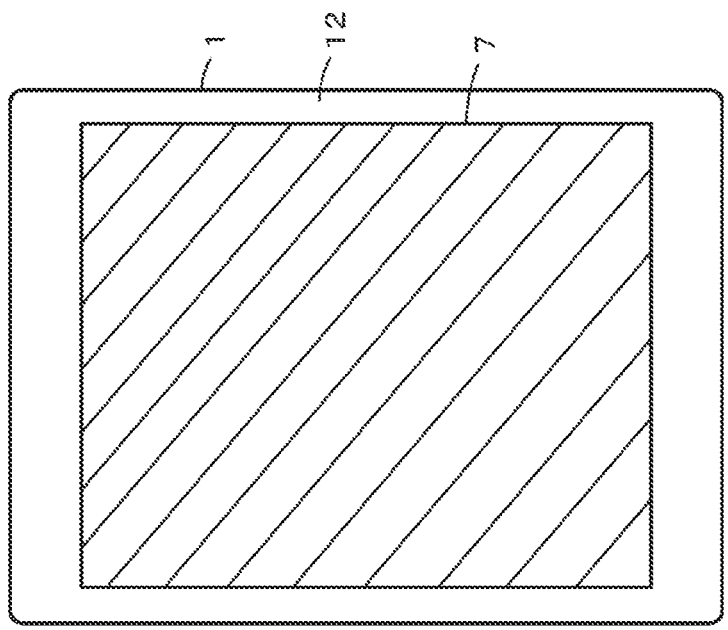
FIGS. 8A and 8B are views for describing the arrangement modes of a feel-of-writing sheet and a non-slip sheet.
Figure 8A:
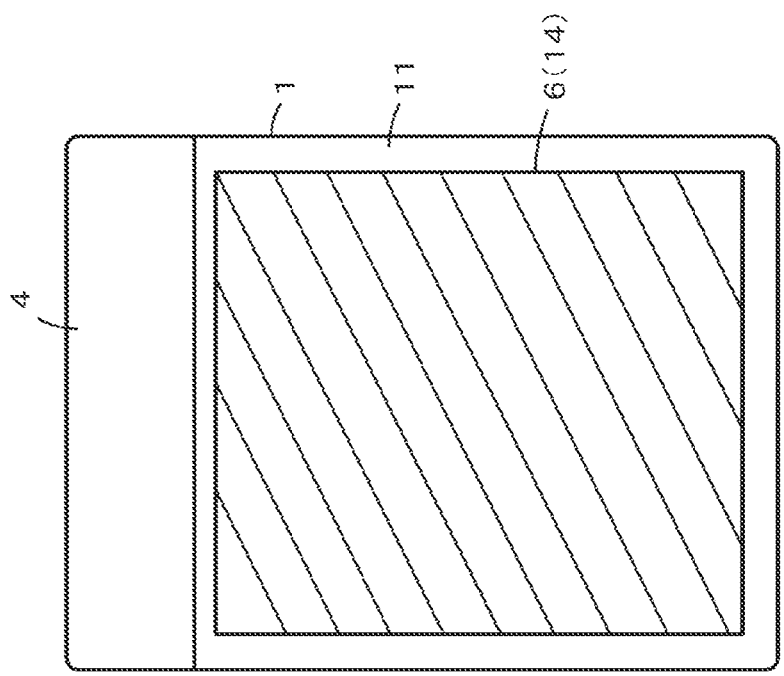

FIGS. 8A and 8B are views for describing the arrangement modes of a feel-of-writing sheet and a non-slip sheet. As described above, the bag-shaped protective member 1 is formed using polypropylene in the first embodiment. Therefore, when the electronic pen is brought into contact with the operation input region (operation surface) 14 of the bag-shaped protective member 1, there is a possibility that the operation input region 14 may be slippery or the feel of writing may not be good. Moreover, when the position detection device is placed on a desk for use, the position detection device itself may move easily and become difficult to use since the desk surface is usually smooth and flat.

Therefore, a feel-of-writing sheet 6 is attached to the operation input region 14 on the outer surface of the front surface sheet 11 of the bag-shaped protective member 1, as illustrated in FIG. 8A. The feel-of-writing sheet 6 is formed in a sheet shape from any of various types of resin, silicone, synthetic rubber, and so forth. The material of the feel-of-writing sheet 6 and the asperities formed on a front surface of the feel-of-writing sheet 6 provide various feels of writing. This gives a user various feels of writing such as a feel of writing as if the user wrote on paper with a pencil or a feel of writing as if the user wrote on paper with a ballpoint pen, when a pen tip of the electronic pen is in contact with the feel-of-writing sheet 6 attached to the bag-shaped protective member 1. Needless to say, the electronic pen does not slip easily on the feel-of-writing sheet 6 even when the electronic pen is in contact with the feel-of-writing sheet 6, so that a drawing (writing) input can be performed well.

As illustrated in FIG. 8B, a non-slip sheet 7 is attached to an outer surface of the back surface sheet 12 of the bag-shaped protective member 1 to address the problem that the position detection device itself is easy to move. The non-slip sheet 7 is formed using, for example, a material with a large coefficient of friction, such as synthetic rubber or natural rubber. Therefore, for example, it is possible to use a non-slip sheet formed using any of various types of resin and silicone with such characteristics as softness and adsorption. This makes it possible to realize the position detection device that is less likely to slip (move) and can be used stably even when the position detection device is placed on a smooth and flat surface of a desk. The shape of the non-slip sheet 7 is not limited to a square shape illustrated in FIG. 8B. The non-slip sheet 7 can have any of various shapes such as a circle and a star as long as the non-slip effect can be obtained. Thus, a plurality of small non-slip sheets may be attached to the outer surface of the back surface sheet 12 of the bag-shaped protective member 1.

Characteristics of Thickness of Position Detection Device (Plate Tablet)

Figure 9A:
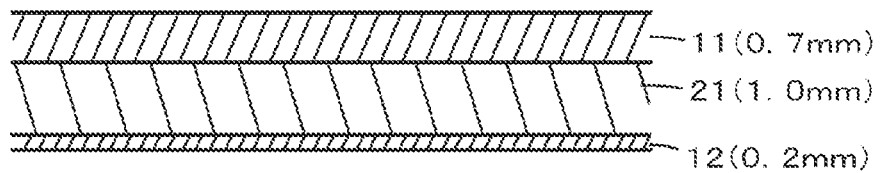
FIGS. 9A and 9B are views for describing the stacked structure of the position detection device according to the first embodiment of the present disclosure.
Figure 9B:
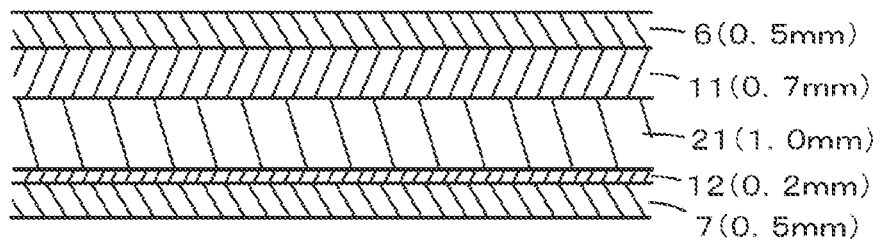

FIGS. 9A and 9B are views for describing the stacked structure of the position detection device according to the first embodiment. As illustrated in FIG. 9A, the configuration of the operation input region 14, which is a portion of the position detection device according to the first embodiment that accepts an indication input, is such that the sensor 21 of the position detection sensor member 2 is positioned between the front surface sheet 11 and the back surface sheet 12 of the bag-shaped protective member 1. As described with reference to FIG. 4, the sensor 21 is formed by stacking the metal sheet member 21MS, the X-axis direction loop coil group 21X, the insulating layer 21ZK, and the Y-axis direction loop coil group 21Y in order from the bottom. The sensor 21 has a thickness of 1.0 mm or less.

The front surface sheet 11 is a polypropylene sheet with a thickness of 0.7 mm because the front surface sheet 11 is on the side where an operation is performed with the electronic pen, while the back surface sheet 12 is a polypropylene sheet with a thickness of 0.2 mm because the back surface sheet 12 is on the side where an operation is not performed with the electronic pen. In this case, the portion of the position detection device that accepts an indication input has a thickness of 2.0 mm or less, which makes it possible to realize the extremely thin position detection device (plate tablet). The front surface sheet 11 and the back surface sheet 12 may have the same thickness. As described later, a single sheet may be folded in half to form the bag-shaped protective member 1.

Consider attaching the feel-of-writing sheet 6 and the non-slip sheet 7 described above to the position detection device having the configuration illustrated in FIG. 9A. Specifically, as illustrated in FIG. 9B, the feel-of-writing sheet 6 is provided on the topmost layer, and the non-slip sheet 7 is provided on the bottommost layer. In this case, when both the feel-of-writing sheet 6 and the non-slip sheet 7 have a thickness of 0.5 mm, the extremely thin position detection device (plate tablet) with a thickness of 3.0 mm or less can be realized even if the feel-of-writing sheet 6 and the non-slip sheet 7 are provided.

In the case of providing the feel-of-writing sheet 6, the thickness of the front surface sheet 11 of the bag-shaped protective member 1 can also be approximately 0.2 mm, for example, so that even with the feel-of-writing sheet 6 and the non-slip sheet 7 provided, the position detection device (plate tablet) with a thickness of approximately 2.5 mm can be realized. Since the thickness of the front surface sheet 11, the back surface sheet 12, the sensor 21, the feel-of-writing sheet 6, and the non-slip sheet 7 can be adjusted in various ways, the position detection device (plate tablet) having the indication input accepting portion with a thickness of 1.85 to 3.5 mm can be realized.

Advantageous Effects of First Embodiment

The position detection device according to the first embodiment described above is an easy-to-carry and simply configured position detection device that is extremely thin and is not broken even when bent. In addition, the position detection device can be produced in many sizes with reduced initial cost. Further, it is possible to provide various types of position detection devices that meet the users' preferences. Specifically, multiple types of bag-shaped protective members 1, position detection sensor members 2, spacer members 3, board cover members 4, and USB cables 5 in different colors, sizes, and shapes are prepared.

The user can select and assemble the bag-shaped protective member 1, the position detection sensor member 2, the spacer member 3, the board cover member 4, and the USB cable 5 in consideration of the color, size, and shape the user prefers, in order to form and use the position detection device (plate tablet) of his/her choice. In this case, the type of USB cable connector, the type of feel-of-writing sheet, and the type of non-slip sheet can also be selected. Moreover, the position detection device (plate tablet) can be realized inexpensively as a whole.

Further, since the position detection sensor member 2 is housed inside the bag-shaped protective member 1 with the opening 13 of the bag-shaped protective member 1 closed, the position detection device is waterproofed and moisture-proofed with excellence. In other words, even if a drink or the like is spilled on the position detection device according to the first embodiment, the position detection device can be continuously used without causing any defect in the performance as long as the user wipes it off.

Further, the front surface sheet 11 and the back surface sheet 12 of the bag-shaped protective member 1, the spacer member 3, and the board cover member 4 can be mass-produced using what is generally called a cutting-die production method. In a case where the board cover member 4 is made of metal, mass-production is possible using wire discharge machining. Therefore, the position detection device according to the first embodiment is suitable for producing inexpensive position detection devices in large quantities.

Modifications of First Embodiment

The simplest configuration of the position detection device (plate tablet) according to the first embodiment is such that the position detection sensor member 2 to which the USB cable 5 is connected is housed in the bag-shaped protective member 1 with three sides of the two polypropylene sheets welded together and then the non-welded side (entrance) is welded and closed. However, as described above, the use of the bag-shaped protective member 1 with the opening 13 provided on the front surface sheet 11 allows the sensor 21 of the position detection sensor member 2 to be easily housed inside the bag-shaped protective member 1 to form the position detection device.

In this case, the opening 13 can be closed with, for example, a protective seal or a wide tape to enhance the effects of waterproofing and moisture-proofing. As described in the first embodiment above, the use of the spacer member 3 and the board cover member 4 properly protects the position detection circuitry 23 of the position detection sensor member 2, realizing the position detection device (plate tablet) that functions stably.

In the first embodiment described above, the bag-shaped protective member 1 is described as being configured using a resin material such as polypropylene. In this case, it is desirable that at least the front surface sheet 11 be formed of a transparent or translucent material. Since the transparent or translucent front surface sheet 11 allows the user to visually recognize where the sensor 21 of the position detection sensor member 2 is located, the operation input region can effectively be used, preventing the user from performing an indication operation with the electronic pen outside the operation input region. In this case, the range of the operation input region can be indicated directly on the sensor by, for example, silk printing such that the operation input region can be visually confirmed.

In a case where at least the front surface sheet 11 is not formed of a transparent or translucent material, the following measures can be taken. For example, in the operation input region 14 of the front surface sheet 11, a line may be drawn along the outer edge of the sensor 21 of the position detection sensor member 2, a protruding or recessed portion may be formed along the outer edge, or the inner side of the outer edge may be colored or provided with a protruding or recessed portion. As illustrated in FIG. 8A, the operation input region can also clearly be presented by attaching the feel-of-writing sheet 6 in such a manner as to match the operation input region 14 of the sensor 21.

In the first embodiment described above, the inner side of the outer edge of the bag-shaped protective member 1 (the portion indicated by the dotted line in FIG. 2) is described as being joined by heat welding. However, the present disclosure is not limited thereto. For example, various methods can be employed to join the front surface sheet 11 and the back surface sheet 12 along their outer edges, such as bonding them using an adhesive or mechanically joining them using a staple or the like. In a case where the front surface sheet 11 and the back surface sheet 12 have the same thickness, a single sheet having the area obtained by combining the front surface sheet 11 and the back surface sheet 12 may be folded in half, and portions on three unjoined sides may be joined by, for example, heat welding. In this case, the number of joined portions can be reduced from four sides to three sides. In this case, in a case where the opening 13 is provided on the side to be folded, the opening portion 13a described above may be omitted. This is because only the position detection circuitry 23 and the connection portion 22 need to pass under the sheet.

Figure 10:
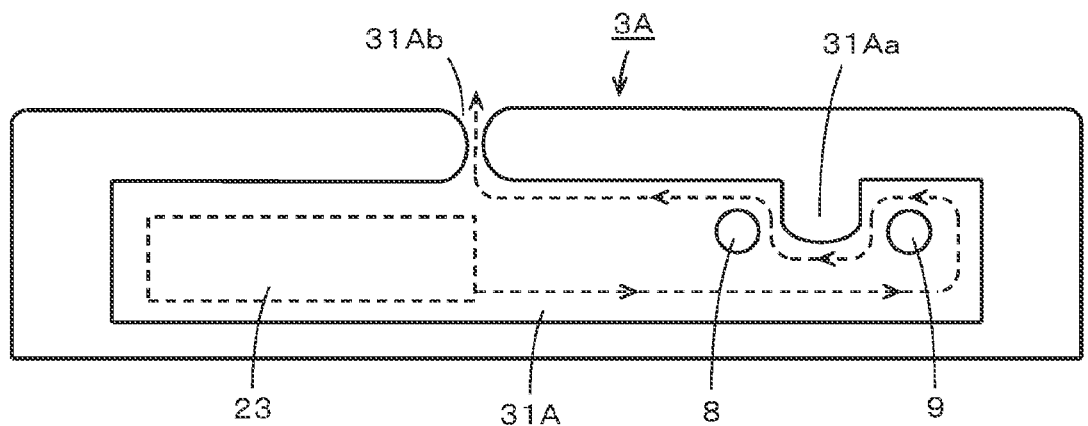
FIG. 10 is a view for describing another example of the spacer member.

Moreover, various modifications may be made to the spacer member 3. FIG. 10 is a view for describing another example of the double-sided tape spacer member 3. A spacer member 3A illustrated in FIG. 10 is also made of a material similar to that of the spacer member 3 described with reference to FIGS. 5A and 5B. The spacer member 3A has a substantially rectangular shape with a predetermined thickness and includes an opening 31A inside thereof. However, the shape of the opening 31A is slightly different from that of the opening 31.

In the case of the spacer member 3A illustrated in FIG. 10, a protruding portion 31Aa, which protrudes inward, is provided on the upper right side of the opening 31A. Further, a slit 31Ab is provided at a position on the slightly left side of the upper center of the opening 31A. The slit 31Ab serves as a port for leading out the USB cable 5, and portions of the spacer member 3A that sandwich the slit 31Ab are shaped in a semicircle. With the spacer member 3A having the above-described shape attached and fixed in such a manner as to correspond to the opening 13 of the bag-shaped protective member 1, a circular member 8, which has the same thickness as that of the spacer member 3A and to which a double-sided tape is attached is further attached on the left side of the protruding portion 31Aa. Further, a circular member 9, which has the same thickness as that of the spacer member 3A and to which with a double-sided tape is attached is attached on the right side of the protruding portion 31Aa.

As indicated by a dotted arrow in FIG. 10, the USB cable 5, which is connected to the position detection circuitry 23 of the position detection sensor member 2, can be led inside the opening 31A of the spacer member 3A which is attached to the bag-shaped protective member 1. In this case, the USB cable 5 is in contact with the semicircular portions of the spacer member 3A on both sides of the slit 31Ab, the circular members 8 and 9 to which double-sided tapes are attached, and the protruding portion 31Aa. This prevents a large force from being applied to the portion of the position detection circuitry 23 connected to the circuit-side connector 52 of the USB cable 5, even if the USB cable 5 led outward is strongly pulled. Accordingly, the position detection device (plate tablet) is configured sturdily and does not cause any defect in the USB cable 5.

Figure 11A:
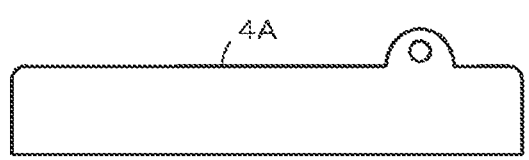
FIGS. 11A to 11C are views for describing another example of the board cover member and so forth.
Figure 11B:
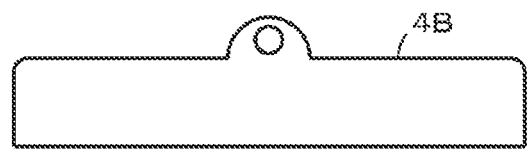
Figure 11C:
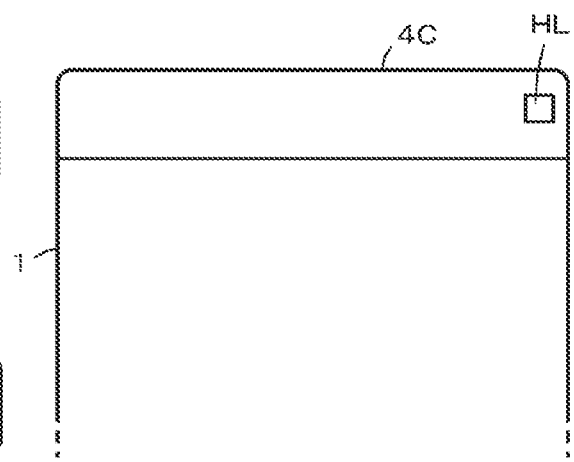

Various modifications can also be made to the board cover member 4. FIGS. 11A to 11C are views for describing another example of the board cover member 4. For example, in a case where the slit 31Ab is provided in the upper central portion of the spacer member 3A as illustrated in FIG. 10, a board cover member 4A with a hook-end side thereof can be formed as illustrated in FIG. 11A. In a case where the slit 31a is provided in the upper right portion of the spacer member 3 as illustrated in FIG. 5A, a board cover member 4B with a hook hole provided in the central portion thereof can be formed as illustrated in FIG. 11B. In other words, it is possible to form a board cover member in which the hook hole is provided in a different position depending on the position at which the USB cable 5 is led out.

As illustrated in FIG. 11C, a through-hole HL may be provided in such a manner as to penetrate a board cover member 4C, the spacer member 3 (or 3A), and the bag-shaped protective member 1. The through-hole HL can be used as an electronic pen holding hole for holding the electronic pen to the position detection device (plate tablet) by hooking a clip of the electronic pen to the through-hole HL.

In the case of the position detection device according to the first embodiment described above, an adhesive is applied to both surfaces of the spacer member 3 to form a double-sided tape-like structure, so that the bag-shaped protective member 1 and the board cover member 4 are joined together using the spacer member 3 as a medium. However, since the bag-shaped protective member 1 and the board cover member 4 are joined together by the adhesive applied to both surfaces of the spacer member 3, some users may feel that the joining is weak. In this case, a through-hole that penetrates the board cover member 4, the spacer member 3, and the bag-shaped protective member 1 is provided at each of the left and right ends of the board cover member 4, and a rivet is inserted into each hole and riveted thereto. This allows the board cover member 4, the spacer member 3, and the bag-shaped protective member 1 to be firmly kept in the joined state.

A cushioning material such as a sponge or felt may be provided between the position detection circuitry 23 positioned in the opening 13 of the bag-shaped protective member 1 and the board cover member 4 to protect the position detection circuitry 23 more strongly.

Figure 12:
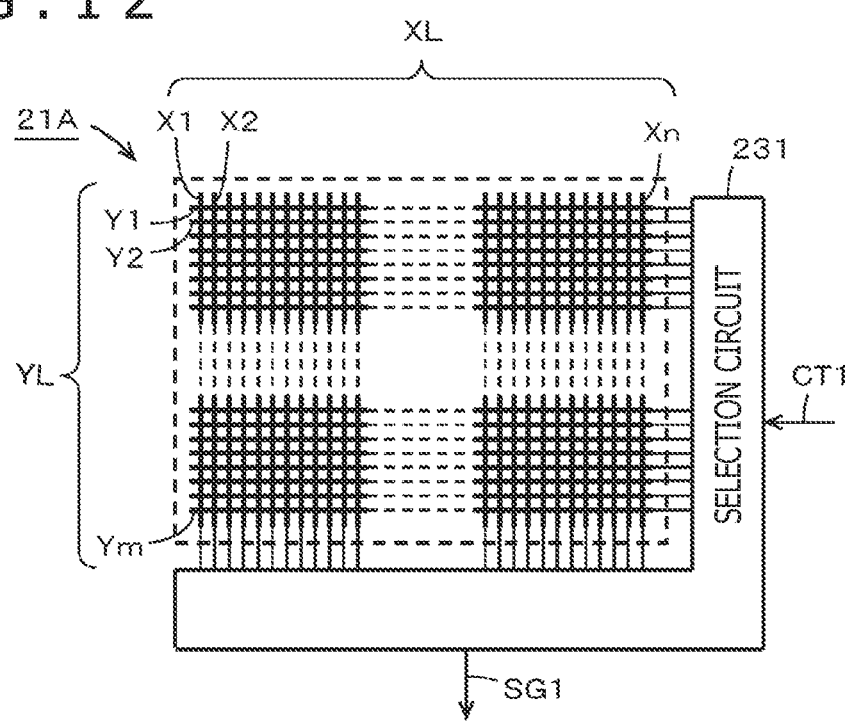
FIG. 12 is a view for describing a configuration of a sensor of a capacitive system.

Although the position detection sensor member 2 according to the first embodiment described above is of the electromagnetic induction system, the present disclosure is not limited thereto. The position detection sensor member 2 may be of the capacitive system. A position detection sensor member 2A of the capacitive system has a basic configuration similar to that of the position detection sensor member 2 of the electromagnetic induction system described with reference to FIG. 3 and includes a sensor 21A, a connection portion 22A, and a position detection circuitry 23A. However, the internal configuration thereof is different from that of the position detection sensor member 2. FIG. 12 is a view for describing an example of a configuration of the sensor 21A of the capacitive system. In FIG. 12, a selection circuit 231 constitutes part of the position detection circuitry 23A, which is connected to the sensor 21A through the connection portion 22A.

As illustrated in FIG. 12, the sensor 21A of the capacitive system includes a Y-axis direction line electrode group YL including m Y-axis direction line electrodes Y1 to Ym, which extend in the X-axis direction (horizontal direction) and are arranged in the Y-axis direction (vertical direction). The sensor 21A also includes an X-axis direction line electrode group XL including n X-axis direction line electrodes X1 to Xn, which extend in the Y-axis direction (vertical direction) and are arranged in the X-axis direction (horizontal direction). In other words, although omitted in FIG. 12, the sensor 21A includes the plurality of Y-axis direction line electrodes and the plurality of X-axis direction line electrodes arranged at equal intervals over the entire surface of the sensor 21A as illustrated in FIG. 12. The plurality of Y-axis direction line electrodes and the plurality of X-axis direction line electrodes are connected to the position detection circuitry 23A through the connection portion 22A.

The position detection circuitry 23A of the capacitive system includes the selection circuit 231 illustrated in FIG. 12 and, for example, an amplification circuit, a position detection circuit, a writing pressure detection circuit, and a control circuit that are not illustrated in FIG. 12. The position detection circuitry 23A sequentially switches the line electrodes that receive a signal according to a control signal CT1. The position detection circuitry 23A supplies a signal (electric field) received through the line electrode selected through the selection circuit 231 to the position detection circuit and the writing pressure detection circuit through a signal line SG1. With this configuration, the position indicated by the electronic pen and the writing pressure of the electronic pen can be detected. In this way, the position detection sensor member 2A of the capacitive system can be configured, and the position detection device (plate tablet) of the capacitive system using the position detection sensor member 2A can be configured.

Although the USB cable 5 is used in the first embodiment described above, the present disclosure is not limited thereto. It is possible to use a cable that conforms to any of various digital interface standards and corresponds to a digital interface of an electronic device to be connected to.

Position Detection Device (Plate Tablet) According to Second Embodiment

A position detection device 100 according to a second embodiment described below includes a flexible single housing sheet 101. The housing sheet 101 includes a position detection circuitry 301 on the front side thereof and a sensor 302 on the back side thereof. In this case, the position detection circuitry 301, which is provided on the front side of the housing sheet 101, is protected by a high rigidity spacer member 110, and the housing sheet 101 is folded back. This makes the position detection circuitry 301 and the high rigidity spacer member 110 enclosed in the housing sheet 101, thereby constituting the unified position detection device 100. The position detection device 100 according to the second embodiment is described in detail below.

Configuration of Appearance of Position Detection Device According to Second Embodiment FIGS. 13A and 13B are views of the appearance of the position detection device 100 according to the second embodiment. Specifically, FIG. 13A illustrates the appearance of the front side (top surface side) of the position detection device 100 while FIG. 13B illustrates the appearance of the back side (bottom surface side) of the position detection device 100. As illustrated in FIG. 13A, a folded portion 101b of the single housing sheet 101, which includes the folded portion 101b and a main body portion 101a, is folded toward the front side such that the folded portion 101b faces the main body portion 101a. The position detection device 100 according to the second embodiment is configured in this way. The housing sheet 101 is made of polypropylene with a thickness of 0.7 mm (millimeters), which is described in detail later. The housing sheet 101, which is made of polypropylene, has excellent heat resistance and flexibility with thin and lightweight properties and has low carbon dioxide ($CO_2$) emissions during production and processing.

Slits (notches) SL1 to SL6 are provided at the folded position of the housing sheet 101, that is, at the boundary between the folded portion 101b and the main body portion 101a. As illustrated in FIG. 13A, the folded portion 101b that has been folded back is positioned on the upper end side of a front surface of the position detection device 100, while the main body portion 101a of the housing sheet 101 is positioned opposite and on the lower side of the folded portion 101b. The surface of the folded portion 101b serving as the front surface of the position detection device 100 (the portion that is supposed to be a back surface of the housing sheet 101) when the folded portion 101b is folded back is what is generally called an embossed surface with fine asperities. This improves the appearance (aesthetics of appearance).

The position detection circuitry 301 indicated by the dotted line in FIG. 13A and the high rigidity spacer member 110 not illustrated are provided at the position where the folded portion 101b of the housing sheet 101 and the main body portion 101a of the housing sheet 101 face each other. A USB cable 130, which is connected to the position detection circuitry 301, is led out to the outside of the position detection device 100 through the slit SL6. The USB cable 130 includes a cable 130a and a connector 130b and is similar to the USB cable 5 according to the first embodiment.

As illustrated in FIG. 13A, an operation surface sheet 200 is attached on the main body portion 101a located on the lower side of the folded portion 101b (the surface on the front side (front surface) of the main body portion 101a) to constitute an operation input region (operation surface) that accepts an indication operation using the electronic pen. The front surface of the main body portion 101a to which the operation surface sheet 200 is attached is what is generally called a glossy surface with few asperities. This improves the adhesion of the adhesive applied to a back surface of the operation surface sheet 200.

The operation surface sheet 200 protects the front surface of the main body portion 101a and provides various feels of writing that meet the users' purposes, as with the feel-of-writing sheet 6 according to the first embodiment described above. In other words, the operation surface sheet 200 is formed in a sheet shape from silicone, synthetic rubber, or the like. The material of the operation surface sheet 200 and asperities formed on a front surface of the operation surface sheet 200 improve the feel of writing and secure scratch resistance.

A back surface protective sheet 102 is attached to the surface on the back side of the position detection device 100, that is, the surface on the back side (back surface (bottom surface)) of the main body portion 101a of the housing sheet 101. The back surface protective sheet 102 is made of polypropylene with a thickness of 0.2 mm. In the position detection device 100 according to the second embodiment, a sheet-shaped sensor (position detection sensor) 302 is provided between a back surface of the main body portion 101a and the back surface protective sheet 102, as indicated by a dotted line in FIG. 13B. Accordingly, as described above, the position detection circuitry 301 is provided on the front side (front surface) of the flexible single housing sheet 101, and the sensor 302 is provided on the back side (back surface) thereof, thereby constituting the unified position detection device 100.

As described above, the back surface protective sheet 102 is thinner than the housing sheet 101, allowing the bulge caused by the thickness of the sensor 302 to escape to the back surface of the position detection device 100 that is the non-writing surface. Accordingly, the surface of the operation surface sheet 200 can realize a uniformly flat operation input region. Further, as described in detail later, since the back surface protective sheet 102 is thin, the welding (bonding) strength can also be improved when welding is performed along the outer edge of the back surface protective sheet 102.

Detailed Configuration of Housing Sheet 101

Figure 14B:
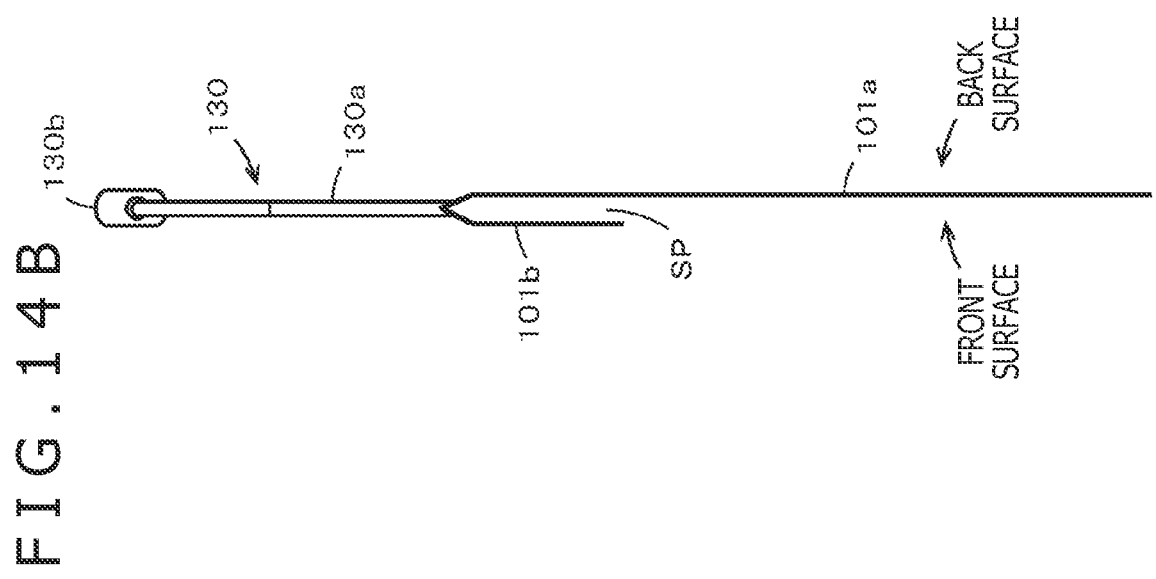
FIGS. 14A and 14B are views for describing a configuration of a housing sheet.
Figure 14A:
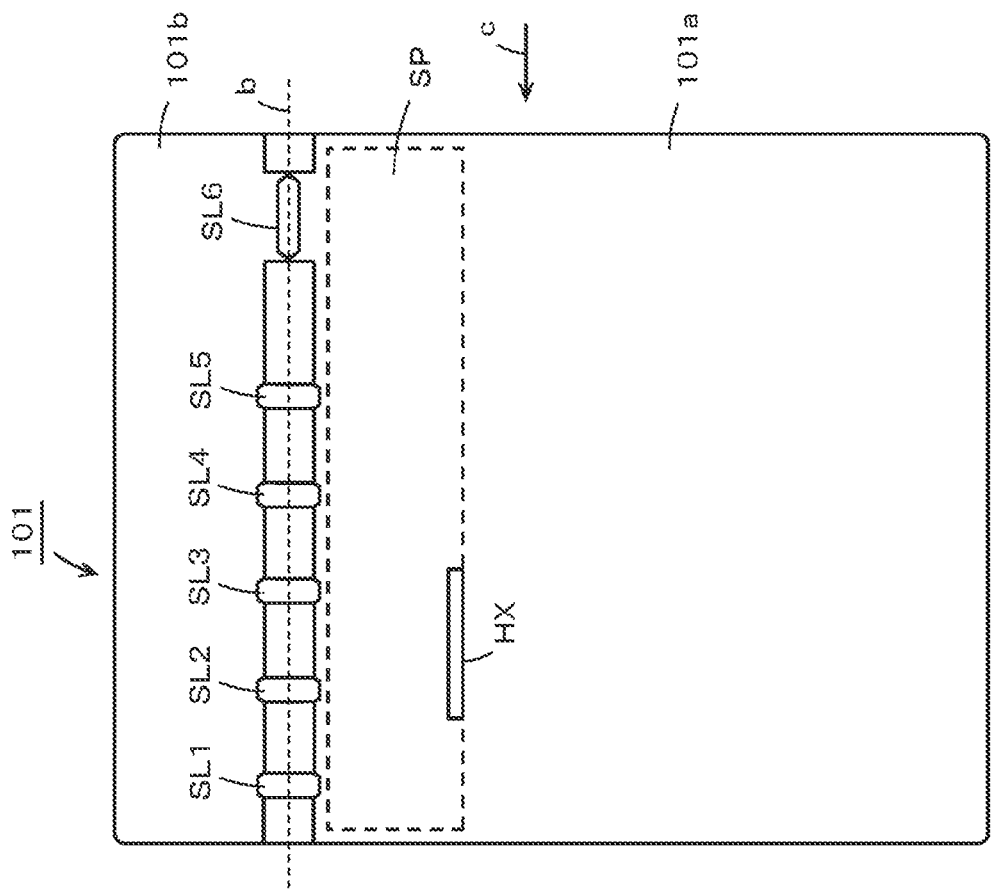

FIGS. 14A and 14B are views for describing a configuration of the housing sheet 101. Specifically, FIG. 14A is an overall view of the housing sheet 101. FIG. 14B is a view of the housing sheet 101 with the folded portion 101b folded back. As illustrated in FIG. 14A, the housing sheet 101 is a single sheet-shaped member made of polypropylene with a thickness of 0.7 mm formed in a rectangular shape. In the housing sheet 101 illustrated in FIG. 14A, the lower side of a folded position b indicated by a dotted line corresponds to the main body portion 101a, while the upper side of the folded position b corresponds to the folded portion 101b. The housing sheet 101 includes the slits (notches) SL1 to SL6 in such a manner as to straddle the folded position b, that is, in such a manner as to connect the upper end of the main body portion 101a and the lower end of the folded portion 101b.

With the presence of the slits SL1 to SL6, the bulging and springback that occur around the folded position b of the housing sheet 101 can be reduced by folding back the folded portion 101b toward the main body portion 101a at the folded position b. Springback refers to a phenomenon in which such a material as a plate returns to its original state when it is bent. As described above, the slit SL6 also functions as a port for leading out the USB cable 130 connected to the position detection circuitry 301 to the outside of the position detection device 100.

An upper end portion of the main body portion 101a on the lower side of the folded position b serves as a space SP in which the position detection circuitry 301 and the high rigidity spacer member 110 described later are provided, as indicated by a dotted rectangle. Therefore, with the folded portion 101b folded back toward the main body portion 101a at the folded position b, the folded portion 101b covers the entire space SP. FIG. 14B illustrates the state of the housing sheet 101 seen from a direction indicated by an arrow c in FIG. 14A, with the folded portion 101b folded back toward the main body portion 101a at the folded position b. That is, a portion including only the main body portion 101a and a portion in which the main body portion 101a and the folded portion 101b face each other are formed.

In FIG. 14B, the portion in which the main body portion 101a and the folded portion 101b face each other corresponds to the space SP illustrated in FIG. 14A, and the position detection circuitry 301 and the high rigidity spacer member 110 are provided in this portion. For this reason, the USB cable 130, which is connected to the position detection circuitry 301, is also illustrated in FIG. 14B in such a manner as to correspond to the appearance of the position detection device 100 according to the second embodiment illustrated in FIGS. 13A and 13B. The operation surface sheet 200 is provided on the front side (front surface) of the portion only including the main body portion 101a, as illustrated in FIG. 13A. Further, the sensor 302 and the back surface protective sheet 102 are provided on the back side (back surface) of the portion only including the main body portion 101a, as illustrated in FIG. 13B.

In this way, the position detection circuitry 301 is provided on the front side of the main body portion 101a, while the sensor 302 is provided on the back side of the main body portion 101a. As illustrated in FIG. 14A, an opening HX is provided at the lower left end of the space SP such that a connection portion 302a, described later, for connecting the position detection circuitry 301 and the sensor 302 can be inserted through the opening HX. Since the position detection circuitry 301 and the sensor 302 are separately and respectively provided on the front surface and the back surface of the main body portion 101a of the housing sheet 101 in this way, the thickness of the portion on which the position detection circuitry 301 and so forth are provided does not affect the operation input region (operation surface).

Figure 15:
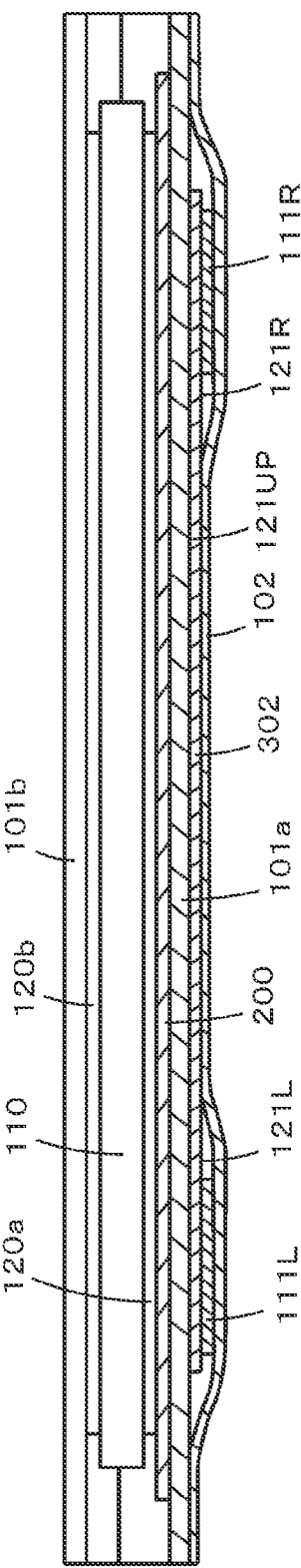
FIG. 15 is a view for describing the stacked structure of the position detection device according to the second embodiment of the present disclosure.

Stacked Structure of Position Detection Device 100 According to Second Embodiment FIG. 15 is a view for describing the stacked structure of the position detection device 100 according to the second embodiment. Specifically, FIG. 15 is a cross-sectional view of the position detection device 100 that is cut at the position indicated by a dotted line A-A of FIG. 13A and seen from the direction indicated by the arrow a of FIG. 13A. Therefore, in FIG. 15, a cut surface at the position indicated by the dotted line A-A of FIG. 13A is illustrated as a cross section with diagonal lines. However, since the portion in which the position detection circuitry 301 and the high rigidity spacer member 110 are provided is not a cross section, the stacked structure thereof is illustrated without diagonal lines.

As illustrated in FIG. 15, the back surface protective sheet 102 is positioned at the bottommost layer. A plate spring 111L is provided on the left side of a front surface (top surface) of the back surface protective sheet 102 while a plate spring 111R is provided on the right side thereof. The plate springs 111L and 111R are formed in a band shape (strip shape) and made of stainless steel (steel use stainless (SUS)) with a thickness of 0.2 mm to suppress warping of the sensor 302 of the position detection device 100 and facilitate return to an initial flat surface state even if the sensor 302 is bent. The plate spring 111L is provided on the left side of the sensor 302, and the plate spring 111R is provided on the right side thereof, to prevent the operation input region (operation surface) of the position detection device 100 from lifting up due to the warping and twisting of the plate springs 111L and 111R themselves.

The sheet-shaped sensor 302 is provided on a front surface (top surface) of the plate springs 111L and 111R. An ultra-thin double-sided adhesive sheet 121L with a thickness of 0.01 mm is provided between the plate spring 111L and a left-side portion of the back surface protective sheet 102 and the sensor 302. Similarly, an ultra-thin double-sided adhesive sheet 121R with a thickness of 0.01 mm is provided between the plate spring 111R and a right-side portion of the back surface protective sheet 102 and the sensor 302. Accordingly, the plate spring 111L, the plate spring 111R, and the back surface protective sheet 102 are attached to the back surface (bottom surface) of the sensor 302 by the ultra-thin double-sided adhesive sheets 121L and 121R.

An ultra-thin double-sided adhesive sheet 121UP with a thickness of 0.01 mm is provided between a front surface (top surface) of the sensor 302 and the main body portion 101a of the housing sheet 101. Accordingly, the sensor 302 is attached to the back surface (bottom surface) of the main body portion 101a by the ultra-thin double-sided adhesive sheet 121UP. The back surface protective sheet 102 has a rectangular shape as illustrated in FIG. 13B and is welded to the back surface (bottom surface) of the main body portion 101a of the housing sheet 101 by ultrasonic welding along the outer edges of the four sides of the back surface protective sheet 102. Accordingly, the sensor 302 is enclosed between the back surface (bottom surface) of the main body portion 101a of the housing sheet 101 and the back surface protective sheet 102.

Each of the ultra-thin double-sided adhesive sheets 121L, 121R, and 121UP is as extremely thin as a thickness of 0.01 mm and therefore do not form steps on the operation input region that serves as the operation surface (writing surface). Since both surfaces of the sensor 302 can be fixed between the housing sheet 101 and the back surface protective sheet 102 by the ultra-thin double-sided adhesive sheets 121L, 121R, and 121UP, no gap is formed and a hard feel can be provided during writing to improve the feel-of-writing.

In the folded portion 101b on the upper end side of the position detection device 100 according to the second embodiment, the high rigidity spacer member 110 is fixed on the main body portion 101a of the housing sheet 101 by a double-sided adhesive tape 120a. In other words, the front surface (top surface) of the main body portion 101a and the back surface (bottom surface) of the high rigidity spacer member 110 are attached to each other by the double-sided adhesive tape 120a. The position detection circuitry 301 is provided in the inner portion of the high rigidity spacer member 110, and the USB cable 130, which is connected to the position detection circuitry 301, is led out to the outside of the position detection device 100 as described with reference to FIG. 13A.

A double-sided adhesive tape 120b is provided between the high rigidity spacer member 110 and the folded portion 101b to attach the high rigidity spacer member 110 and the folded portion 101b to each other. That is, a front surface (top surface) of the high rigidity spacer member 110 and the surface of the folded portion 101b facing the front surface (top surface) of the high rigidity spacer member 110 are attached to each other by the double-sided adhesive tape 120b. Accordingly, the position detection circuitry 301 is mounted in the space SP illustrated in FIGS. 14A and 14B in such a manner as to be protected by the high rigidity spacer member 110 and enclosed by the main body portion 101*a* and the folded portion 101*b* of the housing sheet 101 to constitute the unified position detection device 100.

The double-sided adhesive tapes 120*a* and 120*b* employ what are generally called home material adhesive tapes made of a hard polyurethane resin. Therefore, the double-sided adhesive tapes 120*a* and 120*b* have high strength against peeling. In other words, the position detection circuitry 301 and the high rigidity spacer member 110 can be enclosed between the main body portion 101*a* and the folded portion 101*b* of the housing sheet 101.

As described above, the portion that becomes the front surface when the folded portion 101*b* of the housing sheet 101 is folded back is formed as an embossed surface by emboss processing while the other portion of the housing sheet 101 is formed as a glossy surface by glossy processing, so that multiple characteristics can be obtained with a single material. In other words, the glossy surface provides tackiness and adhesion while the embossed surface improves the aesthetics of the appearance.

Internal Structure of Position Detection Device 100 According to Second Embodiment FIGS. 16A and 16B are views for describing the internal structure of the position detection device 100 according to the second embodiment. Specifically, FIG. 16A is a top view of the position detection device 100 with the illustration of the housing sheet 101, the double-sided adhesive tape 120*b*, and the USB cable 130 omitted. FIG. 16B is a bottom view of the position detection device 100 with the illustration of the back surface protective sheet 102 omitted. The top view means a view of the front surface (top surface) of the position detection device 100 seen from directly above, and the bottom view means a view of the back surface (bottom surface) of the position detection device 100 seen from directly below.

As illustrated in FIG. 16A, the position detection device 100 according to the second embodiment includes a position detection sensor member, which is configured such that the sensor 302 of the electromagnetic induction system is connected to the position detection circuitry 301 through the connection portion 302*a*. The position detection sensor member is configured similarly to the position detection sensor member 2, which includes the sensor 21, the connection portion 22, and the position detection circuitry 23 according to the first embodiment described above.

In the position detection device 100 according to the second embodiment, as illustrated in FIG. 16A, the high rigidity spacer member 110 is used to properly protect the position detection circuitry 301 of the position detection sensor member. The high rigidity spacer member 110 is a plate-shaped member with a thickness of 2 mm and includes a housing portion 110*a* in which the position detection circuitry 301 is housed and a placement portion 110*b* in which the cable 130*a* of the USB cable 130 is placed. Both the housing portion 110*a* and the placement portion 110*b* penetrate from a front surface to a back surface. In the second embodiment, the high rigidity spacer member 110 is made of a high rigidity material such as a hard resin, metal, or wood, for example. Here, high rigidity means that the material is resistant to deformation caused by an external force.

As illustrated in FIG. 16A, the placement portion 110*b* of the high rigidity spacer member 110 is meandering. This is to ensure that, even if the cable 130*a* led out to the outside of the position detection device 100 is pulled, the position detection circuitry 301 to which the USB cable 130 is connected is not affected. In FIG. 16A, the ultra-thin double-sided adhesive sheet 121UP is used to attach the sensor 302 to the back surface (bottom surface) of the main body portion 101*a* of the housing sheet 101, as described above.

In FIG. 16A, the illustration of the housing sheet 101 is omitted. However, as illustrated in FIG. 16B, the sensor 302 of the position detection sensor member is attached to the back surface (bottom surface) of the main body portion 101*a* of the housing sheet 101 by the ultra-thin double-sided adhesive sheet 121UP. As illustrated in FIG. 16A, only the upper portion of the sensor 302 is bonded to the main body portion 101*a* of the housing sheet 101, which is not illustrated, by the ultra-thin double-sided adhesive sheet 121UP. This reduces the stress acting on the sensor 302 when the housing sheet 101 is bent. The ultra-thin double-sided adhesive sheet 121UP with a small area may be provided at multiple places such that the ultra-thin double-sided adhesive sheet 121UP is bonded to the main body portion 101*a* at multiple places.

The position detection circuitry 301 of the position detection sensor member is provided on the front surface (top surface) of the main body portion 101*a* of the housing sheet 101 and at the position facing the folded portion 101*b* of the housing sheet 101. As illustrated in FIG. 16B, the connection portion 302*a*, which is led out from the sensor 302, is inserted through the opening HX, which is provided in the main body portion 101*a* of the housing sheet 101, and connected to the position detection circuitry 301 of the position detection sensor member.

In this way, the sensor 302 is provided on the back surface (bottom surface) of the main body portion 101*a* of the housing sheet 101, and the position detection circuitry 301 is provided on the front surface (top surface) of the main body portion 101*a* of the housing sheet 101. Accordingly, the operation input region on the sensor 302 is kept in the substantially horizontal state at all times without being affected by the thickness of the position detection circuitry 301 or the high rigidity spacer member 110. This realizes the flat operation input region allowing a proper position indication input with the electronic pen.

Further, the plate springs 111L and 111R are attached to the sensor 302 of the position detection sensor member by the ultra-thin double-sided adhesive sheets 121L and 121R on both the left and right sides. The areas of the ultra-thin double-sided adhesive sheets 121L and 121R are comparatively large. For this reason, the back surface protective sheet 102, which is not illustrated in FIG. 16B, is attached to the sensor 302 by the ultra-thin double-sided adhesive sheets 121L and 121R. As described above, the outer edge of the back surface protective sheet 102 is welded to the back surface (bottom surface) of the main body portion 101*a* of the housing sheet 101 by ultrasonic welding, and the sensor 302 and the plate springs 111L and 111R are enclosed between the main body portion 101*a* and the back surface protective sheet 102.

Figure 17B:
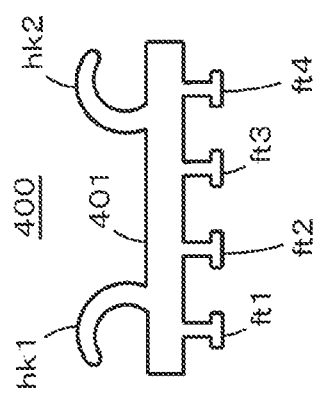
FIGS. 17A to 17C are views for describing external hooks of the position detection device according to the second embodiment of the present disclosure.
Figure 17C:
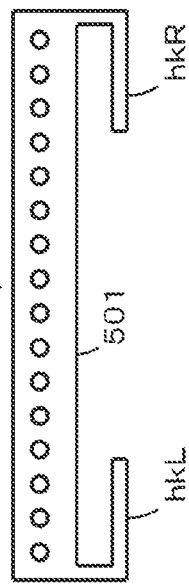
Figure 17A:
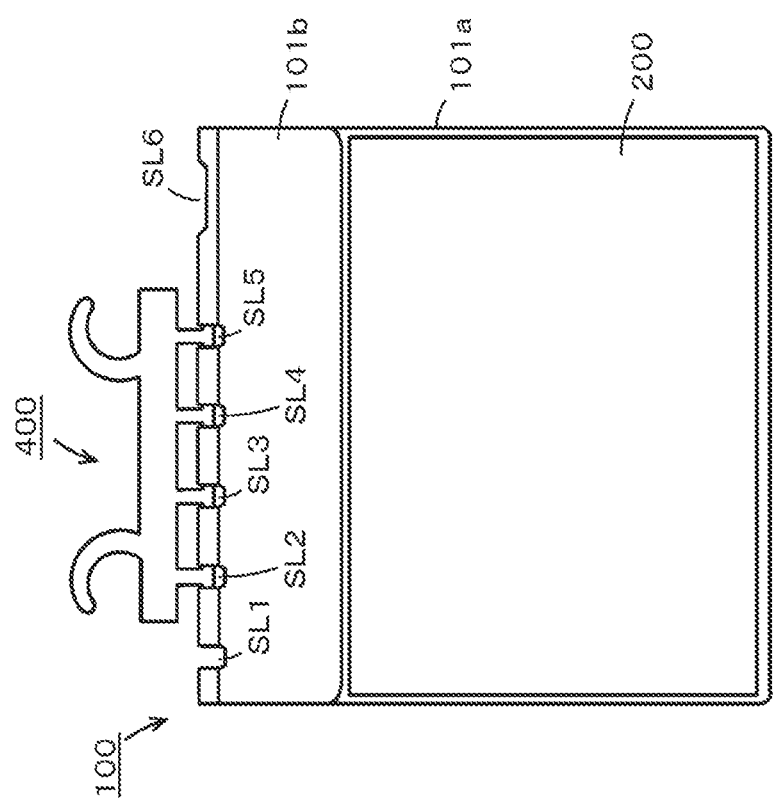

Extended Functions of Position Detection Device 100 According to Second Embodiment FIGS. 17A to 17C are views for describing external hooks of the position detection device 100 according to the second embodiment. As described above, in the position detection device 100 according to the second embodiment, the folded portion 101*b* of one housing sheet 101, which includes the main body portion 101*a* and the folded portion 101*b*, is folded back on the main body portion 101*a*. This constitutes the position detection device 100 having the appearance illustrated in FIG. 17A.

The slits SL1 to SL6, which are used as ports for leading out the USB cable 130, are provided at the folded part, and the slits SL1 to SL5 mainly function to reduce bulging and springback at the folded part. Therefore, as illustrated in FIG. 17A, it is considered that the slits SL1 to SL5 are used to attach an external hook 400 to the position detection device 100.

As illustrated in FIG. 17B, the external hook 400 includes a main body portion 401, leg portions ft1 to ft4, and hook portions hk1 and hk2. The main body portion 401 is a portion connecting the leg portions ft1 to ft4 and the hook portions hk1 and hk2. The leg portions ft1 to ft4 are four portions that extend downward from the main body portion 401 and have ends protruding in the horizontal direction. The leg portions ft1 to ft4 are inserted into the slits SL2 to SL5, respectively, thereby realizing the function of attaching the external hook 400 to the position detection device 100. The hook portions hk1 and hk2 are hooked to ring portions of what is generally called a ring file.

Accordingly, the position detection device (plate tablet) according to the second embodiment can be attached to the ring file such that the user can carry around the position detection device with the ring file without fear of losing or damaging the position detection device and use it on the go, for example. Note that the external hook is not limited to the one illustrated in FIGS. 17A and 17B. One example of the external hook is an external hook 500 with hook portions hkL and hkR protruding inward at the left and right ends of a main body portion 501 with ring holes, as illustrated in FIG. 17C.

The external hook 500 illustrated in FIG. 17C is attached to the position detection device 100 according to the second embodiment by inserting the hook portions hkL and hkR, which protrude inward, into the folded part in which the main body portion 101a and the folded portion 101b of the position detection device 100 face each other. The ring holes of the main body portion 501 correspond to a ring notebook with 26 to 30 rings, for example, and the position detection device 100 can be attached to the ring notebook by inserting the rings of the ring notebook into the ring holes of the main body portion 501.

Thickness of Position Detection Device 100 According to Second Embodiment

As described above, in the position detection device 100 according to the second embodiment, the thickness of the housing sheet 101 is 0.7 mm, and the thickness of the back surface protective sheet 102 is 0.2 mm. Thus, for example, in a case where the thickness of the sensor 302 is 0.4 mm and the thickness of the operation surface sheet 200 is 0.3 mm, it is possible to realize the thin position detection device in which much of the region where the operation surface sheet 200 is provided has a thickness of 1.6 mm or less. In this case, even if the plate springs 111L and 111R and so forth are taken into account, the position detection device with an overall thickness of 2.0 mm or less can be realized.

Advantageous Effects of Second Embodiment

The position detection device according to the second embodiment described above is an easy-to-carry and simply configured position detection device that is extremely thin, does not warp or twist, and allows an indication input with an electronic pen well owing to the flat surface. In addition, the position detection device can be produced in many sizes with reduced initial cost. Further, it is possible to provide various types of position detection devices that meet the users' preferences.

Further, the sensor 302 can be enclosed between the back surface of the housing sheet 101 and the back surface protective sheet 102, and the position detection circuitry 301 can be enclosed between the main body portion 101a and the folded portion 101b of the housing sheet 101. Therefore, the position detection device 100 is waterproofed and moisture-proofed with excellence. In addition, since the perimeter of the position detection circuitry 301 can be covered by the high rigidity spacer member 110, the position detection circuitry 301 can be strongly protected, thereby realizing the position detection device suitable for carrying around.

In the case of the position detection device 100 according to the second embodiment as well, the housing sheet 101, the back surface protective sheet 102, the high rigidity spacer member 110, the operation surface sheet 200, and so forth can be mass-produced using what is generally called a cutting-die production method. In a case where the high rigidity spacer member 110 is made of metal, mass-production is possible using wire discharge machining. Therefore, the position detection device 100 according to the second embodiment is also suitable for mass-production at low cost.

Modifications of Second Embodiment

In the second embodiment described above, the housing sheet 101 and the back surface protective sheet 102 are described as being made of polypropylene. However, the present disclosure is not limited thereto. The housing sheet 101 and the back surface protective sheet 102 can be formed using any of various resin materials such as polyethylene terephthalate, polyamide, polyacetal, polyvinyl chloride, an ABS resin, and polycarbonate.

Although the high rigidity spacer member 110 is described as being formed of a hard material such as a hard resin, metal, or wood, the present disclosure is not limited thereto. For example, the high rigidity spacer member 110 may be made of a material such as a resin material such as urethane, synthetic rubber, natural rubber, or felt that has a certain degree of elasticity and absorbs an external force to prevent the external force from affecting the position detection circuitry 301.

Although the USB cable 130 is used in the second embodiment described above, the present disclosure is not limited thereto. It is possible to use a cable that conforms to any of various digital interface standards and corresponds to a digital interface of an electronic device to be connected to.

Further, although the sensor 302 of the electromagnetic induction system is used in the second embodiment described above, the present disclosure is not limited thereto. As with the position detection device according to the first embodiment, it is possible to use the position detection sensor member of the capacitive system by mounting the sensor of the capacitive system illustrated in FIG. 12 and providing the position detection circuitry corresponding to the sensor of the capacitive system.

In the high rigidity spacer member 110 of the position detection device 100 according to the second embodiment described above, the portion in which the position detection circuitry 301 is provided and the portion in which the USB cable 130 is provided are formed as through-holes penetrating from the front surface to the back surface. However, the present disclosure is not limited thereto. The portion in which the position detection circuitry 301 is provided and the portion in which the USB cable 130 is provided may be formed as non-penetrating recessed portions that cover the position detection circuitry 301 and the USB cable 130, which are provided on the housing sheet 101. In this case, the housing sheet 101 is not necessarily provided with the folded portion 101b to cover the high rigidity spacer member 110.

In the position detection device according to the second embodiment described above, the slits SL1 to SL6 are provided on the folded part serving as the boundary between the main body portion 101*a* and the folded portion 101*b* of the housing sheet 101. An appropriate number of slits with appropriate width can be provided on the folded part serving as the boundary between the main body portion 101*a* and the folded portion 101*b* of the housing sheet 101. In a case where a plurality of slits are provided, each slit may have an appropriate height and width.

Modifications of Position Detection Devices According to First and Second Embodiments The plate springs 111L and 111R used in the position detection device 100 according to the second embodiment described above can also be applied to the position detection device according to the first embodiment. It is also possible to further attach a non-slip sheet to the surface where the back surface protective sheet 102 of the position detection device 100 according to the second embodiment is exposed or to add a non-slip function to the back surface protective sheet 102 itself.

Further, changes can be made to any portions that can be exchanged between the position detection device 100 according to the first embodiment and the position detection device 100 according to the second embodiment. For example, the spacer member 3 used in the first embodiment can be used in place of the high rigidity spacer member 110 according to the second embodiment. Conversely, the high rigidity spacer member 110 according to the second embodiment can be used in place of the spacer member 3 according to the first embodiment.

It is to be noted that the embodiment of the present disclosure is not limited to the foregoing embodiments, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A position detection device comprising:
   a sensor in which a plurality of first electrodes arranged in a first direction and a plurality of second electrodes arranged in a second direction intersecting the first direction are stacked;
   a position detection circuitry that, in operation, detects an indicated position on the sensor based on output signals from the first electrodes and the second electrodes of the sensor; and
   a protective member that is formed in a bag shape and houses at least the sensor inserted from an opening, the protective member having a first surface serving as an operation surface,
   wherein:
   a perimeter of the protective member is closed and the opening from which the sensor is inserted is provided on the first surface,
   the position detection circuitry is positioned in the opening of the protective member, and
   the position detection device further includes:
      a spacer member that surrounds a perimeter of the opening of the protective member and has a first surface that adheres to the protective member, the spacer member having a predetermined thickness, and
      a board cover member that adheres to a second surface of the spacer member to close and seal the opening of the protective member.

2. The position detection device according to claim 1, wherein a perimeter of the protective member is closed and the opening from which the sensor is inserted is provided on the first surface.

3. The position detection device according to claim 1, wherein:
   a perimeter of the protective member is closed and the opening from which the sensor is inserted is provided on the first surface,
   the sensor and the position detection circuitry are housed in the protective member, and
   the opening of the protective member is closed and sealed.

4. The position detection device according to claim 1, wherein a cable for external connection is attached to the position detection circuitry.

5. The position detection device according to claim 1, wherein a surface sheet is provided on the operation surface of the protective member and provides a desired feel of writing when a writing input is performed with a position indicator brought into contact with the operation surface.

6. The position detection device according to claim 1, wherein a non-slip sheet is provided on a surface opposite the operation surface of the protective member.

7. The position detection device according to claim 1, wherein at least the operation surface of the protective member is formed of a transparent or translucent material.

8. The position detection device according to claim 1, wherein the protective member is formed of a resin material and is deformable.

9. The position detection device according to claim 1, wherein the protective member is formed of a resin material and a perimeter of the protective member is sealed by heat welding.

10. The position detection device according to claim 1, wherein a metal sheet member is provided on a second surface of the sensor, and the metal sheet member and the sensor are housed in the protective member.

11. The position detection device according to claim 1, wherein an insulating layer is provided between the first electrodes and the second electrodes.

12. The position detection device according to claim 1, wherein:
   each of the first electrodes and the second electrodes is configured as a loop coil,
   the first electrodes and the second electrodes constitute a position detection sensor of an electromagnetic induction system, and
   the position detection circuitry, in operation, alternates between:
      a transmission period during which power is supplied to a first electrode sequentially selected from among the first electrodes and the second electrodes, and a first magnetic field is generated, and a reception period during which supply of the power stops and a second magnetic field from outside of the position detection device is received through a second electrode sequentially selected from among the first electrodes and the second electrodes.

13. The position detection device according to claim 1, wherein the first electrodes and the second electrodes are linear conductors and constitute a position detection sensor of a capacitive system.

* * * * *